(12) United States Patent
Lomayev et al.

(10) Patent No.: US 10,454,548 B2
(45) Date of Patent: Oct. 22, 2019

(54) APPARATUS, SYSTEM AND METHOD OF COMMUNICATING ACCORDING TO A TRANSMIT SPACE-FREQUENCY DIVERSITY SCHEME

(71) Applicant: INTEL CORPORATION, Santa Clara, CA (US)

(72) Inventors: Artyom Lomayev, Nizhny Novgorod (RU); Alexander Maltsev, Nizhny Novgorod (RU); Michael Genossar, Modiin (IL); Carlos Cordeiro, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 60 days.

(21) Appl. No.: 15/278,928

(22) Filed: Sep. 28, 2016

(65) Prior Publication Data
US 2017/0264351 A1    Sep. 14, 2017

Related U.S. Application Data

(60) Provisional application No. 62/305,624, filed on Mar. 9, 2016.

(51) Int. Cl.
*H04B 7/06* (2006.01)
*H04L 5/00* (2006.01)
(Continued)

(52) U.S. Cl.
CPC .............. *H04B 7/06* (2013.01); *H04L 5/001* (2013.01); *H04L 5/0023* (2013.01); *H04L 5/0094* (2013.01); *H04L 27/18* (2013.01); *H04L 27/34* (2013.01); *H04W 72/1263* (2013.01); *H04B 7/0413* (2013.01); *H04L 5/0007* (2013.01); *H04L 27/2601* (2013.01)

(58) Field of Classification Search
CPC ... H04L 5/0048; H04L 5/0094; H04L 5/0035; H04L 1/18; H04L 27/2627; H04L 27/2636; H04L 1/004
See application file for complete search history.

(56) References Cited

U.S. PATENT DOCUMENTS

| | | | |
|---|---|---|---|
| 2007/0171994 A1* | 7/2007 | Parker | H04L 1/08 375/260 |
| 2009/0323858 A1* | 12/2009 | Seller | H04L 1/0058 375/298 |
| 2010/0091641 A1* | 4/2010 | Gaal | H04B 7/0669 370/208 |
| 2011/0129032 A1 | 6/2011 | Batra et al. | |
| 2011/0193739 A1 | 8/2011 | Strauch et al. | |
| 2014/0064255 A1 | 3/2014 | Trainin et al. | |

(Continued)

FOREIGN PATENT DOCUMENTS

WO    2015198140    12/2015

OTHER PUBLICATIONS

International Search Report and Written Opinion for PCT/US2017/016782, dated Apr. 25, 2017, 11 pages.

(Continued)

*Primary Examiner* — David C Payne
*Assistant Examiner* — Sarah Hassan
(74) *Attorney, Agent, or Firm* — Shichrur & Co.

(57) ABSTRACT

For example, a wireless station may be configured to modulate a plurality of data bit sequences into a plurality of data blocks according to a dual carrier modulation, to map the plurality of data blocks to a plurality of spatial streams according to a space-time diversity scheme, and to transmit a MIMO transmission based on the plurality of spatial streams.

24 Claims, 6 Drawing Sheets

(51) Int. Cl.
　　　H04L 27/18　　(2006.01)
　　　H04L 27/34　　(2006.01)
　　　H04W 72/12　　(2009.01)
　　　H04B 7/0413　 (2017.01)
　　　H04L 27/26　　(2006.01)

(56) References Cited

U.S. PATENT DOCUMENTS

| | | | | |
|---|---|---|---|---|
| 2015/0063479 A1* | 3/2015 | Xiao | ............ | H04L 27/2601 375/267 |
| 2015/0244432 A1* | 8/2015 | Wang | ............ | H04B 7/0695 375/267 |
| 2016/0065351 A1* | 3/2016 | Zhang | ............ | H04L 5/0046 370/329 |
| 2016/0352552 A1* | 12/2016 | Liu | ............ | H04B 1/7176 |

OTHER PUBLICATIONS

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

IEEE Std 802.11ac™—2013. IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz, Dec. 11, 2013, 424 pages.

IEEE Std 802.11ad™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012, 628 pages.

Siavash M. Alamouti, "A Simple Transmit Diversity Technique for Wireless Communications", IEEE Journal on Select Areas in Communications, vol. 16, No. 8, Oct. 1998, pp. 1451-1458, 8 pages.

International Preliminary Report on Patentability for International Application No. PCT/US2017/016782, dated Sep. 20, 2018, 8 pages.

* cited by examiner

APPARATUS, SYSTEM AND METHOD OF COMMUNICATING ACCORDING TO A TRANSMIT SPACE-FREQUENCY DIVERSITY SCHEME

CROSS REFERENCE

This application claims the benefit of and priority from U.S. Provisional Patent Application No. 62/305,624 entitled "Apparatus, System and Method of Communicating According to a Transmit Space-Frequency Diversity Scheme", filed Mar. 9, 2016, the entire disclosure of which is incorporated herein by reference.

TECHNICAL FIELD

Embodiments described herein generally relate to communicating according to a transmit space-frequency diversity scheme.

BACKGROUND

A wireless communication network in a millimeter-wave (mmWave) band may provide high-speed data access for users of wireless communication devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
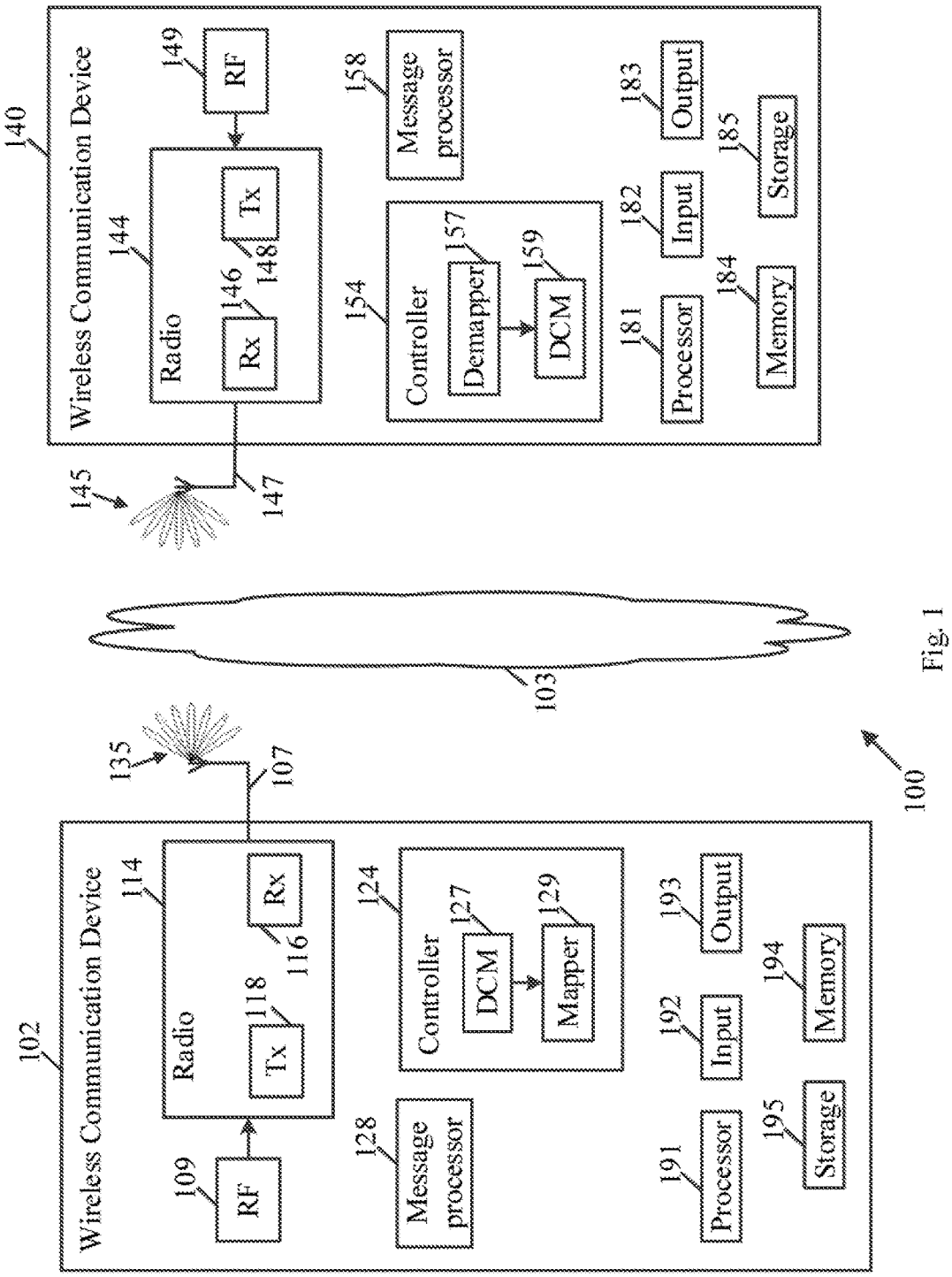
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a sensor device, an Internet of Things (IoT) device, a wearable device, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including *IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac*-2013 (*"IEEE P802.11ac*-2013, *IEEE Standard for Information Technology—Telecommunications and Information Exchange Between Systems—Local and Metropolitan Area Networks Specific Requirements—Part 11: Wireless LAN Medium Access Control (MAC) and Physical Layer (PHY) Specifications—Amendment 4: Enhancements for Very High Throughput for Operation in Bands below 6 GHz"*, *December,* 2013); *IEEE* 802.11*ad* (*"IEEE P802.11ad-2012, IEEE Standard for Information Technol-*

*ogy—Telecommunications and Information Exchange Between Systems—Local and Metropolitan Area Networks—Specific Requirements—Part* 11: *Wireless LAN Medium Access Control (MAC) and Physical Layer (PHY) Specifications—Amendment* 3: *Enhancements for Very High Throughput in the 60 GHz Band"*, 28 December, 2012); *IEEE-802.11REVmc ("IEEE 802.11-REVmc™/D3.0, June* 2014 *draft standard for Information technology—Telecommunications and information exchange between systems Local and metropolitan area networks Specific requirements; Part* 11: *Wireless LAN Medium Access Control (MAC) and Physical Layer (PHY) Specification"*); *IEEE*802.11-*ay (P802.11ay Standard for Information Technology—Telecommunications and Information Exchange Between Systems Local and Metropolitan Area Networks— Specific Requirements Part* 11: *Wireless LAN Medium Access Control (MAC) and Physical Layer (PHY) Specifications—Amendment: Enhanced Throughput for Operation in License-Exempt Bands Above* 45 *GHz*)) and/or future versions and/or derivatives thereof, devices and/or networks operating in accordance with existing WiFi Alliance (WFA) Peer-to-Peer (P2P) specifications (including *WiFi P2P technical specification, version* 1.5, *Aug.* 4, 2015) and/or future versions and/or derivatives thereof, devices and/or networks operating in accordance with existing Wireless-Gigabit-Alliance (WGA) specifications (including *Wireless Gigabit Alliance, Inc WiGig MAC and PHY Specification Version* 1.1, *April* 2011, *Final specification*) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, group or), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a wireless fidelity (WiFi) network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 Ghz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "peer to peer (PTP) communication", as used herein, may relate to device-to-device communication over a wireless link ("peer-to-peer link") between devices. The PTP communication may include, for example, a WiFi Direct (WFD) communication, e.g., a WFD Peer to Peer (P2P) communication, wireless communication over a direct link within a Quality of Service (QoS) basic service set (BSS), a tunneled direct-link setup (TDLS) link, a STA-to-STA communication in an independent basic service set (IBSS), or the like.

The phrases "directional multi-gigabit (DMG)" and "directional band" (DBand), as used herein, may relate to a frequency band wherein the Channel starting frequency is above 45 GHz. In one example, DMG communications may involve one or more directional links to communicate at a rate of multiple gigabits per second, for example, at least 1 Gigabit per second, e.g., at least 7 Gigabit per second, at least 30 Gigabit per second, or any other rate.

Some demonstrative embodiments may be implemented by a DMG STA (also referred to as a "millimeter-wave (mmWave) STA (mSTA)"), which may include for example, a STA having a radio transmitter, which is capable of operating on a channel that is within the DMG band. The DMG STA may perform other additional or alternative functionality. Other embodiments may be implemented by any other apparatus, device and/or station.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a wireless communication device 102, a wireless communication device 140, and/or one more other devices.

In some demonstrative embodiments, wireless communication devices 102 and/or 140 may include a mobile device or a non-mobile, e.g., a static, device.

For example, wireless communication devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, a handheld device, an Internet of Things (IoT) device, a sensor device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, an RF channel, a Wireless Fidelity (WiFi) channel, an IR channel, a Bluetooth (BT) channel, a Global Navigation Satellite System (GNSS) Channel, and the like.

In some demonstrative embodiments, WM 103 may include a directional channel in a directional frequency band. For example, WM 103 may include a millimeter-wave (mmWave) wireless communication channel.

In some demonstrative embodiments, WM 103 may include a DMG channel. In other embodiments, WM 103 may include any other additional or alternative directional channel.

In other embodiments, WM 103 may include any other type of channel over any other frequency band.

In some demonstrative embodiments, devices 102 and/or 140 may perform the functionality of one or more wireless stations (STA), e.g., as described below.

In some demonstrative embodiments, devices 102 and/or 140 may perform the functionality of one or more DMG stations.

In other embodiments, devices 102 and/or 140 may perform the functionality of any other wireless device and/or station, e.g., a WLAN STA, a WiFi STA, and the like.

In some demonstrative embodiments, devices 102 and/or 140 may be configured to perform the functionality of an access point (AP), e.g., a DMG AP, and/or a personal basic service set (PBSS) control point (PCP), e.g., a DMG PCP, for example, an AP/PCP STA, e.g., a DMG AP/PCP STA.

In some demonstrative embodiments, devices 102 and/or 140 may be configured to perform the functionality of a non-AP STA, e.g., a DMG non-AP STA, and/or a non-PCP STA, e.g., a DMG non-PCP STA, for example, a non-AP/PCP STA, e.g., a DMG non-AP/PCP STA.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In some demonstrative embodiments, devices 102 and/or 140 may include one or more radios including circuitry and/or logic to perform wireless communication between devices 102, 140 and/or one or more other wireless communication devices. For example, device 102 may include a radio 114, and/or device 140 may include a radio 144.

In some demonstrative embodiments, radio 114 and/or 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radios 114 and/or 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a directional band, for example, an mmWave band, and/or any other band, for example, a 2.4 GHz band, a 5 GHz band, a S1G band, and/or any other band.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a System on Chip (SoC). In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, radios 114 and/or 144 may include, or may be associated with, a plurality of directional antennas.

In some demonstrative embodiments, device 102 may include one or more, e.g., a plurality of, directional antennas 107, and/or device 140 may include on or more, e.g., a plurality of, directional antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or 147 may include directional antennas, which may be steered to one or more beam directions. For example, antennas 107 may be steered to one or more beam directions 135, and/or antennas 147 may be steered to one or more beam directions 145.

In some demonstrative embodiments, antennas 107 and/or 147 may include and/or may be implemented as part of a single Phased Antenna Array (PAA).

In some demonstrative embodiments, antennas 107 and/or 147 may be implemented as part of a plurality of PAAs, for example, as a plurality of physically independent PAAs.

In some demonstrative embodiments, a PAA may include, for example, a rectangular geometry, e.g., including an integer number, denoted M, of rows, and an integer number, denoted N, of columns. In other embodiments, any other types of antennas and/or antenna arrays may be used.

In some demonstrative embodiments, antennas 107 and/or antennas 147 may be connected to, and/or associated with, one or more Radio Frequency (RF) chains.

In some demonstrative embodiments, device 102 may include one or more, e.g., a plurality of, RF chains 109 connected to, and/or associated with, antennas 107.

In some demonstrative embodiments, device 140 may include one or more, e.g., a plurality of, RF chains 149 connected to, and/or associated with, antennas 147.

In some demonstrative embodiments devices 102 and/or 140 may be configured to communicate over a Next Generation 60 GHz (NG60) network, an Extended DMG (EDMG) network, and/or any other network. For example, devices 102 and/or 140 may perform Multi-In-Multi-Out (MIMO) communication, for example, for communicating over the NG60 and/or EDMG networks, e.g., over an NG60 or an EDMG frequency band.

Some demonstrative embodiments may be implemented, for example, as part of a new standard in an mmWave band, e.g., a 60 GHz frequency band or any other directional band, for example, as an evolution of an *IEEE 802.11ad standard*.

In some demonstrative embodiments, devices 102 and/or 140 may be configured according to one or more standards, for example, in accordance with an *IEEE 802.11ay Standard*, which may be, for example, configured to enhance the efficiency and/or performance of an *IEEE 802.11ad Specification*, which may be configured to provide WiFi connectivity in a 60 GHz band.

Some demonstrative embodiments may enable, for example, to significantly increase the data transmission rates defined in the *IEEE 802.11ad specification*, for example, from 7 Gbps, e.g., up to 30 Gbps, or to any other data rate, which may, for example, satisfy growing demand in network capacity for new coming applications.

Some demonstrative embodiments may be implemented, for example, to allow increasing a transmission data rate, for example, by applying Multiple Input Multiple Output (MIMO) and/or channel bonding techniques.

Some wireless communication Specifications, for example, the *IEEE 802.11ad-2012 Specification*, may be configured to support a Single User (SU) system, in which a Station (STA) may transmit frames to a single STA at a time.

Some demonstrative embodiments may enable, for example, communication in one or more use cases, which may include, for example, a wide variety of indoor and/or outdoor applications, including but not limited to, for example, at least, high speed wireless docking, ultra-short range communications, 8K Ultra High Definition (UHD) wireless transfer at smart home, augmented reality headsets and high-end wearables, data center inter-rack connectivity, mass-data distribution or video on demand system, mobile offloading and multi-band operation, mobile front-hauling, and/or wireless backhaul.

In some demonstrative embodiments, a communication scheme may include Physical layer (PHY) and/or Media Access Control (MAC) layer schemes, for example, to support one or more applications, and/or increased transmission data rates, e.g., data rates of up to 30 Gbps, or any other data rate.

In some demonstrative embodiments, the PHY and/or MAC layer schemes may be configured to support frequency channel bonding over a mmWave band, e.g., over a 60 GHz band, Single User (SU) techniques, and/or Multi User (MU) MIMO techniques.

In some demonstrative embodiments, devices 102 and/or 140 may be configured to implement one or more mechanisms, which may be configured to enable SU and/or MU communication of Downlink (DL) and/or Uplink frames (UL) using a MIMO scheme.

In some demonstrative embodiments, devices 102 and/or 140 may be configured to communicate MIMO communications over the mmWave wireless communication band.

In some demonstrative embodiments, devices 102 and/or 140 may be configured to communicate over an NG60 network, an EDMG network, and/or any other network and/or any other frequency band. For example, devices 102 and/or 140 may be configured to communicate DL MIMO transmissions and/or UL MIMO transmissions, for example, for communicating over the NG60 and/or EDMG networks.

In some demonstrative embodiments, devices 102 and/or 140 may be configured to implement one or more techniques, which may, for example, enable to support communications over a MIMO communication channel, e.g., a SU-MIMO channel between two mmWave STAs, or a MU-MIMO channel between a STA and a plurality of STAs.

In some demonstrative embodiments, devices 102 and/or 140 may be configured to communicate according to a diversity scheme for MIMO transmission, e.g., as described below.

In some demonstrative embodiments, devices 102 and/or 140 may be configured to communicate according to a space-frequency diversity scheme, which may be configured, for example, for OFDM MIMO, e.g., as described below.

In some demonstrative embodiments, the space-frequency diversity scheme may be implemented for example, for communication in accordance with an *IEEE 802.11ay Specification*, and/or any other standard, protocol and/or specification.

In some demonstrative embodiments, devices 102 and/or 140 may be configured to communicate according to a space-frequency transmit diversity scheme for OFDM modulation, which may be configured, for example, for 2×N MIMO communication, e.g., as described below. In other embodiments, a space-frequency transmit diversity scheme for OFDM modulation may be configured, for example, for any other type of MIMO communication, e.g., any other M×N MIMO communication, e.g., wherein N is equal or greater than 2, and M is equal or greater than 2.

In some demonstrative embodiments, devices 102 and/or 140 may be configured to communicate according to a space-frequency transmit diversity scheme, which may utilize a frequency diversity scheme, for example, according to one or more Dual Carrier Modulation (DCM) techniques, e.g., as described below.

In some demonstrative embodiments, devices 102 and/or 140 may be configured to communicate according to a transmit space-frequency diversity scheme, which may extract, for example, both space and frequency diversity, and may combine a dual carrier modulation scheme, for example, using DCM techniques, e.g., which may be in compliance with an *IEEE* 802.11*ad Specification*, and one or more space-time techniques, for example, Alamouti space-time techniques, e.g., as described below.

In some demonstrative embodiments, the transmit space-frequency diversity scheme may be configured, for example, in compliance with one or more aspects of an Alamouti technique, for example, as described by Siavash M. Alamouti, "*A Simple Transmit Diversity Technique for Wireless Communications,*" *IEEE Journal on Selected Areas in Communications*, vol. 16, no. 8, October 1998.

In one example, the transmit space-frequency diversity scheme may be configured to support, for example, transmission from 2 Transmit (TX) antennas to N Receive (RX) antennas, for example, for communication according to a 2×N MIMO scheme.

In some demonstrative embodiments, the transmit space-frequency diversity scheme may be configured, for example, based on a combination of a space-time diversity technique, e.g., an Alamouti space-time diversity technique, and Dual Carrier Modulations (DCMs), e.g., in compliance with an *IEEE* 802.11*ad Specification*, for the OFDM PHY.

In some demonstrative embodiments, combining DCM modulation in conjunction with Alamouti space-time technique may allow, for example, extracting both space-time and frequency diversity channel gains.

For example, implementing DCM may allow to extract additional channel frequency diversity gain, e.g., in addition to space-time diversity gain which may be provided by a space-time diversity technique; and/or implementing a space-time diversity technique, e.g., an Alamouti space-time diversity technique, may allow to extract additional space-time channel diversity gain, e.g., in addition to the frequency diversity gain which may be provided by DCM.

In some demonstrative embodiments, combining DCM modulation in conjunction with a space-time diversity technique may provide a robust scheme, e.g., to both space-time and frequency channel deviations.

Some demonstrative embodiments are described herein with respect to a transmit space-frequency diversity scheme, which may be configured based on a combination of a DCM scheme and an Alamouti-based diversity scheme. However, other embodiments may be implemented with respect to any other additional or alternative transmit space-frequency diversity scheme, which may be configured based on a combination of any other frequency diversity scheme, and/or any other space-time diversity scheme, for example, a Space Time Block Code (STBC) scheme, and/or any other diversity scheme.

In some demonstrative embodiments, a first device ("transmitter device" or "transmitter side"), e.g., device 102, may be configured to generate and transmit a MIMO transmission based on a plurality of spatial streams, for example, in accordance with a transmit space-frequency diversity scheme, e.g., as described below.

In some demonstrative embodiments, a second device ("receiver device" or "receiver side"), e.g., device 140, may be configured to receive and process the MIMO transmission based on the plurality of spatial streams, for example, in accordance with the transmit space-frequency diversity scheme, e.g., as described below.

In some demonstrative embodiments, one or more aspects of the transmit space-frequency diversity scheme described herein may be implemented, for example, to provide at least a technical solution to allow a simple combining scheme at the receiver device, for example, to mitigate and/or cancel out interference, e.g., Inter Stream Interference (ISI), to combine channel diversity gain, which may provide reliable data transmission, e.g., even in hostile channel conditions, and/or to provide one or more additional and/or alternative advantages and/or technical solutions.

For example, in some embodiments, the receiver side may not even be required to use a MIMO equalizer, for example, while being able to use at least only Single Input Single Output (SISO) equalizers, e.g., in each stream of the plurality of spatial streams. According to this example, the transmit space-frequency MIMO scheme may be simple for implementation.

In some demonstrative embodiments, a PHY and/or Media Access Control (MAC) layer for a system operating in the 60 GHz band, e.g., the system of FIG. 1, may be defined, for example, in accordance with an *IEEE* 802.11*ad Standard*, a future *IEEE* 802.11*ay Standard*, and/or any other Standard.

In some demonstrative embodiments, some implementations may be configured to communicate a MIMO transmission over a directional channel, for example, using beamforming with a quite narrow beamwidth and fast enough signal transmission with typical frame duration, e.g., of about 100 microseconds (usec). Such implementations may allow, for example, having a static channel per entire packet transmission, and/or may enable the receiver side to perform channel estimation at the very beginning of the packet, e.g., using a Channel Estimation Field (CEF). A phase may be tracked, for example, instead of performing channel tracking using pilots. This may allow, for example, assuming a substantially unchanged or static channel over two or more successive symbol transmissions.

In some demonstrative embodiments, devices 102 and/or 140 may be configured to communicate a MIMO transmission according to a transmit space-frequency diversity scheme, which may be based on a space-time diversity scheme, for example, a Space Time Block Code (STBC) scheme, e.g., an Alamouti diversity scheme, or any other space-time diversity scheme, e.g., as described below.

For example, a space-time diversity scheme, e.g., in accordance with the Alamouti diversity scheme, may be configured to transmit a pair of signals, denoted $(S_0, S_1)$, for example, concurrently via two antennas, denoted #0 and #1, at a time moment, denoted t; followed by repetition of the signals with coding, e.g., the signals $(-S_1^*, S_0^*)$, via the antennas #0 and #1, at a subsequent time moment, denoted t+T. The symbol * denotes an operation of complex conjugation. This diversity scheme may create two orthogonal sequences in a space-time domain.

In some demonstrative embodiments, it may be assumed that the channel does not change during consequent vector transmissions, for example, for communications over a narrow beamwidth, e.g., over a directional frequency band, as described above. Accordingly, it may be assumed that the sequential transmissions of the signals $S_0$ and $-S_1^*$ are transmitted through a substantially unchanged or static channel having a substantially unchanged or static channel coefficient $H_0$, and/or that the sequential transmissions of the signals $S_1$ and $S_0^*$ are transmitted through a substantially unchanged or static channel having a substantially unchanged or static channel coefficient $H_1$.

Figure 2:
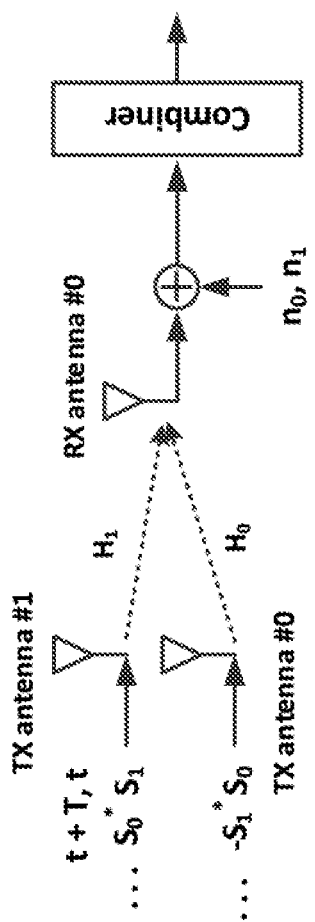
FIG. 2 is a schematic illustration of an Alamouti transmit diversity scheme, which may be implemented, in accordance with some demonstrative embodiments.

FIG. 2 is a schematic illustration of an Alamouti transmit diversity scheme, which may be implemented, in accordance with some demonstrative embodiments. For example, the transmit diversity scheme of FIG. 2 illustrates spatial coding for an Alamouti transmit diversity scheme with a 2×1 configuration.

Referring back to FIG. 1, in some demonstrative embodiments, devices 102 (FIG. 1) and/or 140 (FIG. 1) may be configured to communicate according to a transmit space-frequency diversity scheme, which may be configured based on the transmit diversity scheme of FIG. 2, for example, for 2×N MIMO communication, e.g., as described below.

In some demonstrative embodiments, a diversity scheme, which may be configured, for example, for OFDM modulation, may be applied, for example, in a frequency domain, for example, by repetition mapping to subcarriers, e.g., as described below.

In some demonstrative embodiments, a pair of symbols, denoted $(X_k, Y_k)$, may be mapped to a subcarrier with an index k of an OFDM symbol, denoted symbol#1, to two spatial streams, denoted stream#1 and stream#2; and a repetition of the symbols with coding, e.g., $(-Y_k^*, X_k^*)$, may be mapped to a subsequent OFDM symbol, denoted symbol#2, to the same subcarrier with the index k to the two spatial streams, e.g., as described below.

In some demonstrative embodiments, it may be assumed that the channel per subcarrier does not change, for example, due to the stationary property of the channel in a directional frequency band, e.g., the 60 GHz band. Accordingly, at a receiver side, an optimal combining technique, e.g., in accordance with an Alamouti combining technique, may be applied, for example, to create diversity gain and/or cancel out inter stream interference.

In some demonstrative embodiments, devices 102 and/or 140 may be configured to communicate according to a space-frequency diversity scheme, which may be based on a combination of a frequency diversity scheme, e.g., DCM and/or any other frequency diversity scheme, and a space-time scheme, e.g., an Alamouti-based Technique and/or any other space-time diversity scheme, as described below.

In some demonstrative embodiments, devices 102 and/or 140 may be configured to communicate according to a transmit space-frequency diversity scheme, which may utilize one or more Phase Shift Keying (PSK) modulation schemes, e.g., as described below. In other embodiments, devices 102 and/or 140 may be configured to communicate according to a transmit space-frequency diversity scheme, which may utilize any other additional or alternative modulation scheme, e.g., any modulation which is based or not based on PSK.

In some demonstrative embodiments, devices 102 and/or 140 may be configured to communicate according to a transmit space-frequency diversity scheme, which may utilize, for example, Staggered quadrature phase-shift keying (SQPSK) and/or Quadrature Phase Shift Keying (QPSK) dual carrier modulation schemes, e.g., as described below. In other embodiments, devices 102 and/or 140 may be configured to communicate according to a space-frequency transmit diversity scheme, which may utilize any other additional or alternative dual carrier modulation scheme, and/or multi-carrier modulation scheme.

In some demonstrative embodiments, the space-frequency transmit diversity scheme may be configured to use SQPSK and/or QPSK modulations, which may be compatible with "legacy" dual carrier modulations, for example, in compliance with an *IEEE* 802.11*ad Standard* and/or any other Standard or protocol.

For example, some standards, for example, an *IEEE* 802.11*ad Standard*, may support Single-In-Single-Out (SISO) dual carrier SQPSK and QPSK modulations mapping subcarriers to different sub-bands, for example, to exploit a frequency diversity property in frequency selective channels.

In some demonstrative embodiments, the SQPSK and/or QPSK dual carrier modulations may exploit two subcarriers in an OFDM signal spectrum to carry data, and, accordingly, may allow extracting a diversity gain in frequency selective channels. This may be achieved, for example, by mapping data symbols to the different parts of the signal spectrum, e.g., to different sub-bands.

For example, the SQPSK and/or QPSK dual carrier modulations may be able to provide substantially the same performance as single carrier modulations, for example, in a frequency flat channel.

In some demonstrative embodiments, controller 124 may be configured to cause, trigger, and/or control a wireless station implemented by device 102 to generate and transmit a MIMO transmission to at least one other station, for example, a station implemented by device 140, e.g., as described below.

In some demonstrative embodiments, controller 124 may be configured to cause, trigger, and/or control the wireless station implemented by device 102 to generate a plurality of spatial streams in a frequency domain based on data, which may be represented by encoded data bits, e.g., as described below.

In some demonstrative embodiments, controller 124 may be configured to cause, trigger, and/or control the wireless station implemented by device 102 to modulate a plurality of data bit sequences corresponding to the data to be transmitted into a plurality of data blocks in the frequency domain, e.g., as described below.

In some demonstrative embodiments, controller 124 may include, operate as, and/or perform the functionality of a DCM module 127, which may be configured to modulate the plurality of data bit sequences into the plurality of data blocks according to a dual carrier modulation, e.g., as described below.

In some demonstrative embodiments, DCM module 127 may be configured to exploit a pair of tones in an OFDM signal spectrum to carry constellation points, e.g., as described below.

In some demonstrative embodiments, DCM module 127 may be configured to modulate a data bit sequence of the plurality of data bit sequences into first and second consecutive data symbols in a data block of the plurality of data blocks, e.g., as described below.

In some demonstrative embodiments, DCM module 127 may be configured to modulate the data bit sequences according to an SQPSK DCM, e.g., as described below.

For example, DCM module 127 may be configured to map a data bit sequence including two data bits to first and second symbols including first and second respective QPSK constellation points, e.g., as described below.

For example, DCM module 127 may be configured to map a data bit sequence including two data bits to a first QPSK constellation point and a second constellation point, which may be a complex conjugate of the first constellation point, e.g., as described below.

In some demonstrative embodiments, DCM module 127 may be configured to generate a pair of QPSK constellation points, denoted $(s_0, s_1)$, for example, based on a data bit sequence including two encoded bits, denoted $(c_0, c_1)$, e.g., as follows:

$$s_0 = \frac{1}{\sqrt{2}}((2c_0 - 1) + j(2c_1 - 1)) \qquad (1)$$

$$s_1 = \frac{1}{\sqrt{2}}((2c_0 - 1) - j(2c_1 - 1))$$

For example, DCM module 127 may be configured to determine the point $s_1$ by simple conjugation of the point $s_0$, e.g., $s_1 = s_0^*$, which may correspond, for example, to a repetition 2× of the second constellation point.

In some demonstrative embodiments, DCM module 127 may be configured to modulate the data bit sequences according to a QPSK DCM, e.g., as described below.

For example, DCM module 127 may be configured to map a data bit sequence including four data bits into the first and second symbols, e.g., as described below.

For example, DCM module 127 may be configured to map first and second data bits of the four data bits to a first QPSK constellation point, and to map third and fourth data bits of the four data bits to a second QPSK constellation point, e.g., as described below.

For example, DCM module 127 may be configured to map the first and second QPSK constellation points to first and second 16 Quadrature Amplitude Modulation (16QAM) constellation points, e.g., as described below.

In some demonstrative embodiments, DCM module 127 may be configured to generate the pair of QPSK constellation points $(s_0, s_1)$, for example, based on a data bit sequence including 4 encoded bits, denoted $(c_0, c_1, c_2, c_3)$, for example, in two operations, e.g., as described below.

For example, in a first operation, the encoded bits $(c_0, c_1, c_2, c_3)$ may be converted into two QPSK constellation points, e.g., as follows:

$$x_0 = \frac{1}{\sqrt{2}}((2c_0 - 1) + j(2c_2 - 1)) \qquad (2)$$

$$x_1 = \frac{1}{\sqrt{2}}((2c_1 - 1) + j(2c_3 - 1))$$

For example, in a second operation, the pair of constellation points $(s_0, s_1)$ may be obtained, for example, by multiplying the vector $(x_0, x_1)$ by a matrix, e.g., as follows:

$$\begin{bmatrix} s_0 \\ s_1 \end{bmatrix} = \frac{1}{\sqrt{5}} \begin{bmatrix} 1 & 2 \\ -2 & 1 \end{bmatrix} \times \begin{bmatrix} x_0 \\ x_1 \end{bmatrix} \qquad (3)$$

In some demonstrative embodiments, the constellation points $(s_0, s_1)$ may lie in a 16QAM constellation grid. However, this may be more than just a repetition 2×, but rather encoding in place, e.g., since $s_0 \neq s_1$.

In other embodiments, DCM module 127 may be configured to modulate the data bit sequences into the data blocks according to any other dual carrier or multi-carrier modulation scheme.

In some demonstrative embodiments, controller 124 may include, operate as, and/or perform the functionality of a mapper 129, which may be configured to map the plurality of data blocks to a plurality of spatial streams, for example, according to a space-time diversity mapping scheme, e.g., as described below.

In some demonstrative embodiments, mapper 129 may be configured to map first and second pairs of data symbols to first and second pairs of subcarriers of first and second respective OFDM symbols in first and second spatial streams, e.g., as described below.

In some demonstrative embodiments, mapper 129 may be configured to map a first pair of data symbols of a first data block to a first pair of respective subcarriers of a first OFDM symbol in a first spatial stream; to map a second pair of data symbols of a second data block to the first pair of respective subcarriers of the first OFDM symbol in a second spatial stream; to map a complex conjugate of the first pair of data symbols to a second pair of respective subcarriers of a second OFDM symbol in the second spatial stream; and/or to map a sign-inversed complex conjugate of the second pair of data symbols to the second pair of respective subcarriers of the second OFDM symbol in the first spatial stream, e.g., as described below.

In some demonstrative embodiments, the first pair of subcarriers may include a first subcarrier in a first sub-band of a signal band of the first OFDM symbol, and/or a second subcarrier in a second sub-band of the signal band of the first OFDM symbol, e.g., as described below.

In some demonstrative embodiments, the second pair of subcarriers may include a third subcarrier in a first sub-band of a signal band of the second OFDM symbol, and/or a fourth subcarrier in a second sub-band of the signal band of the second OFDM symbol, e.g., as described below.

In some demonstrative embodiments, the first sub-band of the first OFDM symbol may include a first half of the signal band of the first OFDM symbol, and/or the second sub-band of the first OFDM symbol may include a second half of the signal band of the first OFDM symbol, e.g., as described below.

In some demonstrative embodiments, the first sub-band of the second OFDM symbol may include a first half of the signal band of the second OFDM symbol, and/or the second sub-band of the second OFDM symbol may include a second half of the signal band of the second OFDM symbol, e.g., as described below.

In some demonstrative embodiments, the first pair of data symbols may include a k-th symbol and a (k+1)-th symbol in the first data block, and/or the second pair of data symbols may include a k-th symbol and a (k+1)-th symbol in the second data block, e.g., as described below.

In some demonstrative embodiments, the first subcarrier may include a k-th subcarrier in the first sub-band of the first OFDM symbol, and/or the second subcarrier may include a P(k)-th subcarrier in the second sub-band of the first OFDM symbol, wherein P(k) is a predefined permutation of k, e.g., as described below.

In some demonstrative embodiments, the third subcarrier may include a k-th data subcarrier in the first sub-band of the second OFDM symbol, and/or the fourth subcarrier may include a P(k)-th subcarrier in the second sub-band of the second OFDM symbol, e.g., as described below.

In some demonstrative embodiments, mapper 129 may be configured to determine the permutation P(k) according to a Static Tone Pairing (STP) permutation.

In some demonstrative embodiments, mapper 129 may be configured to determine the permutation P(k) according to a Dynamic Tone Pairing (DTP) permutation.

In other embodiments, mapper 129 may be configured to determine the permutation P(k) according to any other permutation mechanism and/or scheme.

In some demonstrative embodiments, an STP mapping mode may be applied, for example, for PHY header transmission.

In some demonstrative embodiments, the STP mapping mode may be applied for Physical layer Service Data Unit (PSDU) transmission, for example, if a header field includes a Tone Pairing Filed=0.

In other embodiments, the STP mode may be applied according to any other criteria.

In some demonstrative embodiments, the STP mapping mode may include mapping symbol pairs, e.g., SQPSK or QPSK symbol pairs, using the indexes k and P(k). For example, a k-th repeated symbol may be mapped to the second half of the signal spectrum with the index the P(k)=168+k, e.g., k=0:167 for a size of 168 subcarriers.

In some demonstrative embodiments, a DTP mapping mode may be applied for PSDU transmission, for example, if the header field includes the Tone Pairing Filed=1. In other embodiments, the DTP mode may be applied according to any other criteria.

In some demonstrative embodiments, the DTP mapping mode may include dividing a symbol stream, e.g., a SQPSK or QPSK symbol stream, into a plurality of groups of symbols, for example, 42 groups of 4 symbols, e.g., for a size of 168 subcarriers, or any other number of groups of any other number of symbols, and/or for any other size.

In some demonstrative embodiments, the DTP mapping may include mapping the groups of 4 symbols, e.g., continuously, to the first half of the spectrum.

In some demonstrative embodiments, each group of 4 symbols may be repeated in the second half of the spectrum, for example, by applying interleaving on a group basis.

In some demonstrative embodiments, group interleaving may be defined based on an array, for example, a GroupPairIndex array, e.g., in the range of 0 to 41, for example, with respect to 42 groups, or any other array.

In some demonstrative embodiments, a repeated symbol index in the second half of the signal spectrum may be determined, for example, as follows:

$$P(k) = 168 + 4 \cdot GroupPairIndex\left(\left\lfloor \frac{k}{4} \right\rfloor\right) + \mod(k, 4), k = 0:167 \quad (4)$$

In some demonstrative embodiments, the DCM may allow, for example, to avoid complete data symbol loss, for example, even in case of a deep notch in a frequency response, e.g., due to the data duplication in the second half of the frequency band.

In some demonstrative embodiments, the STP mapping approach may at least provide, for example, a maximal equal space between the tones carrying the same information.

In some demonstrative embodiments, the DTP mapping may allow, for example, at least adaptive pairing of tones, for example, based on channel state information feedback.

In some demonstrative embodiments, lost tones, e.g., with low SNR, in the second sub-band of the frequency band may be, for example, grouped with strong tones, e.g., with high SNR, in the first sub-band of the frequency band. For example, medium quality tones may be grouped with each other.

In some demonstrative embodiments, this adaptive approach for pairing of tones may provide, for example, equal protection of symbols, e.g., even under hostile frequency selectivity conditions.

In some demonstrative embodiments, controller 124 may be configured to cause, trigger, and/or control the wireless station implemented by device 102 to transmit a MIMO transmission based on the plurality of spatial streams, e.g., as described below.

In some demonstrative embodiments, controller 124 may be configured to cause, trigger, and/or control the wireless station implemented by device 102 to transmit the plurality of spatial streams via a plurality of directional antennas. For example, controller 124 may be configured to cause, trigger, and/or control the wireless station implemented by device 102 to transmit the first spatial stream via a first antenna of antennas 107, and to transmit the second spatial stream via a second antenna of antennas 107.

In some demonstrative embodiments, the MIMO transmission may include a 2×N MIMO transmission, e.g., as described below. In other embodiments, the MIMO transmission may include any other M×N MIMO transmission.

In some demonstrative embodiments, the MIMO transmission may include an OFDM MIMO transmission including a plurality of OFDM symbols based on the plurality of spatial streams, e.g., as described below.

In some demonstrative embodiments, controller 124 may be configured to cause, trigger, and/or control the wireless station implemented by device 102 to transmit the MIMO transmission over a directional frequency band, for example, a DMG band.

Figure 3:
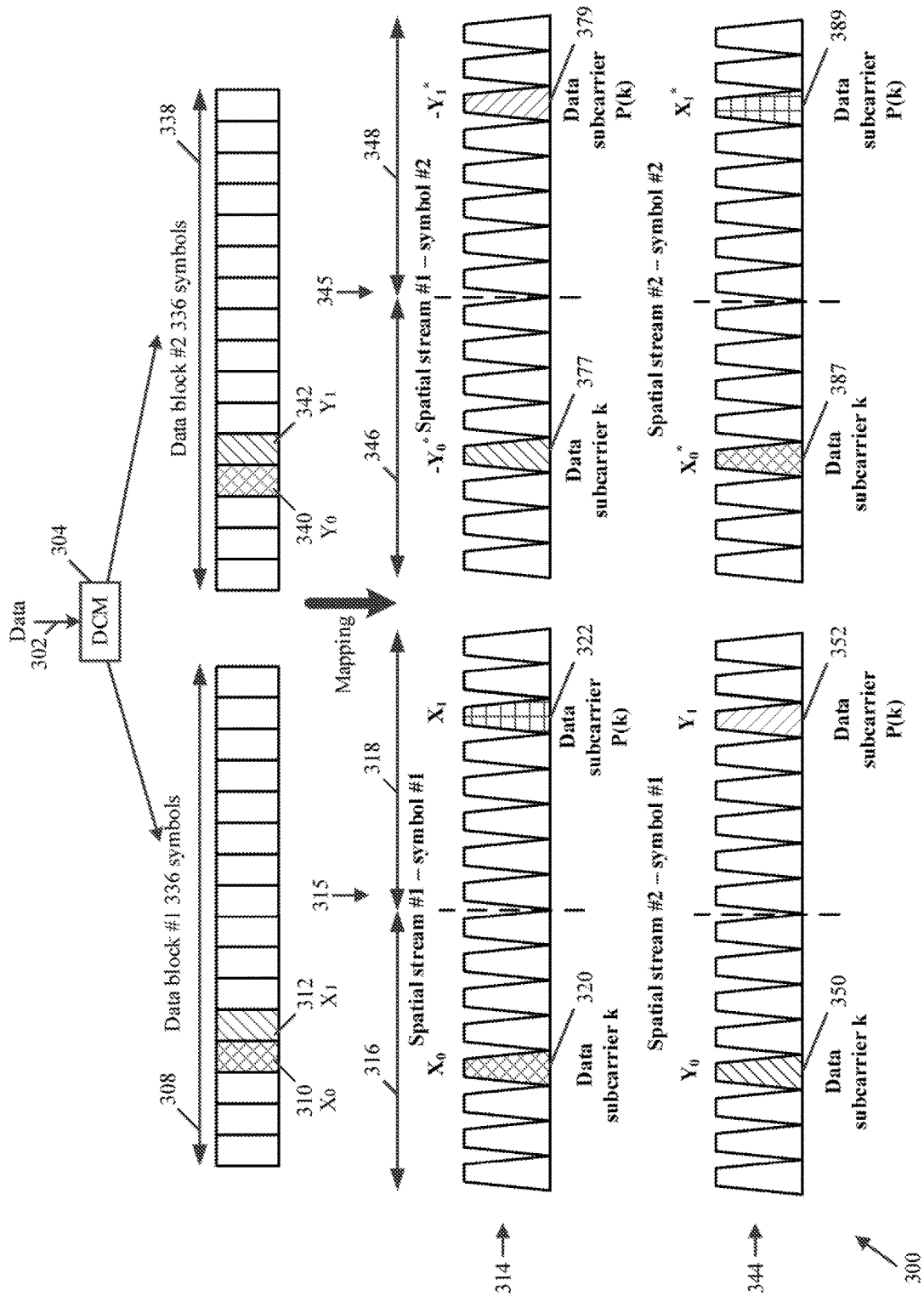
FIG. 3 is a schematic illustration of a space-frequency mapping scheme, in accordance with some demonstrative embodiments.

Reference is made to FIG. 3, which schematically illustrates a space-frequency mapping scheme 300, in accordance with some demonstrative embodiments. For example, a wireless station, e.g., a wireless station implemented by device 102 (FIG. 1), may be configured to map data to data subcarriers of a plurality of spatial streams according to mapping scheme 300, e.g., as described below. In one example, controller 124 (FIG. 1), DCM module 127 (FIG. 1) and/or mapper 129 (FIG. 1), may be configured to cause, trigger, and/or control the wireless station implemented by device 102 (FIG. 1) to map data to be transmitted in a MIMO transmission according to space-frequency mapping scheme 300.

In some demonstrative embodiments, space-frequency mapping scheme 300 may be configured to support dual carrier modulations for 2×N MIMO, e.g., to support an implementation in accordance with an *IEEE 802.11ay Specification*.

In some demonstrative embodiments, space-frequency diversity mapping scheme 300 may be configured based on a dual carrier modulation scheme 304, e.g., as described below.

In some demonstrative embodiments, the dual carrier modulation scheme 304 may be configured to modulate data 302 into a plurality of data blocks including a plurality of symbols.

In some demonstrative embodiments, the dual carrier modulation scheme 304 may be configured to modulate a plurality of data bit sequences of data 302 into the plurality of data blocks, for example, by modulating a data bit sequence of the plurality of data bit sequences into first and second consecutive symbols in a data block of the plurality of data blocks, e.g., as described below.

In some demonstrative embodiments, as shown in FIG. 3, the dual carrier modulation scheme 304 may be configured to modulate the data bit sequences of data 302 into a plurality of blocks, e.g., including a first data bock 308 and a second data block 338, having a predefined number of data symbols, e.g., 336 data symbols or any other number of data symbols.

In some demonstrative embodiments, as shown in FIG. 3, the dual carrier modulation scheme 304 may be configured to modulate a data bit sequence of the plurality of data bit sequences into first and second consecutive symbols in a data block of the plurality of data blocks.

For example, as shown in FIG. 3, the dual carrier modulation scheme 304 may be configured to modulate a plurality of data bit sequences into a plurality of pairs of consecutive symbols of data block 308, e.g., including the pair of consecutive symbols 310 and 312, which may correspond to a data bit sequence. For example, the symbol 310 may include a first DCM symbol, denoted $X_0$, and the symbol 312 may include a second DCM symbol, denoted $X_1$, which may both be based on a same first data bit sequence, e.g., as described above.

For example, as shown in FIG. 3, the dual carrier modulation scheme 304 may be configured to modulate another plurality of data bit sequences into a plurality of pairs of consecutive symbols of data block 338, e.g., e.g., including the pair of consecutive symbols 340 and 342, which may correspond to another data bit sequence. For example, the symbol 340 may include a first DCM symbol, denoted $Y_0$, and the symbol 342 may include a second DCM symbol, denoted $Y_1$, which may both be based on a same second data bit sequence, e.g., as described above.

In some demonstrative embodiments, the dual carrier modulation scheme 304 may be configured to modulate the plurality of data bit sequences according to an SQPSK DCM scheme, e.g., as described above. For example, the pair of symbols 310 and 312 may include the respective pair of QPSK constellation points $(s_0,s_1)$ corresponding to a two-bit data bit sequence; and the pair of symbols 340 and 342 may include the respective pair of QPSK constellation points $(s_0,s_1)$ corresponding to another two-bit data bit sequence, e.g., as described above.

In some demonstrative embodiments, the dual carrier modulation scheme 304 may be configured to modulate the plurality of data bit sequences according to a QPSK DCM scheme, e.g., as described above. For example, the pair of symbols 310 and 312 may include the respective pair of 16QAM constellation points $(s_0,s_1)$ corresponding to a four-bit data bit sequence; and the pair of symbols 340 and 342 may include the respective pair of 16QAM constellation points $(s_0,s_1)$ corresponding to another four-bit data bit sequence, e.g., as described above.

In some demonstrative embodiments, the symbols $X_0$ and $X_1$ may include a first pair of dependent symbols, for example, the pair of DCM symbols representing the same first plurality of data bits, e.g., as described above with respect to the QPSK and/or SQPSK DCM.

In some demonstrative embodiments, the symbols $Y_0$ and $Y_1$ may include a second pair of dependent symbols, for example, the pair of DCM symbols representing the same second plurality of data bits, e.g., as described above with respect to the QPSK and/or SQPSK DCM.

In some demonstrative embodiments, as shown in FIG. 3, the space-frequency diversity mapping scheme 300 may be configured to extend the dual carrier modulation scheme with a space-time diversity, e.g., between a plurality of symbols in a plurality of spatial streams, e.g., two symbols in two streams as shown in FIG. 3.

In some demonstrative embodiments, space-frequency mapping scheme 300 may be configured to map symbols of first data block 308 and symbols of second data block 338 to subcarriers of a first OFDM symbol 315 and a second OFDM symbol 345 in a first spatial stream 314 and a second spatial stream 344, e.g., as described below.

In some demonstrative embodiments, two pairs of DCM symbols, e.g., the pairs $(X_0, X_1)$ and $(Y_0, Y_1)$, may be mapped to OFDM subcarriers of the OFDM symbols 315 and 345 in the spatial streams 314 and 344, e.g., as described below.

In some demonstrative embodiments, the pair of symbols $X_0$ and $X_1$ may be mapped to a pair of subcarriers in the first spatial stream 314 and the first OFDM symbol in time 315, e.g., as described below.

In some demonstrative embodiments, a repetition of the pair of symbols $X_0$ and $X_1$ may be mapped with complex conjugation, for example, to the same pair of subcarriers in the first spatial stream 344 and the second OFDM symbol in time 345, e.g., as described below.

In some demonstrative embodiments, the pair of symbols $Y_0$ and $Y_1$ may be mapped to a pair of subcarriers in the second spatial stream 344 and the first OFDM symbol in time 315, e.g., as described below.

In some demonstrative embodiments, a repetition of the pair of symbols $Y_0$ and $Y_1$ may be mapped with complex conjugation and sign inversion, for example, to the same pair of subcarriers in the first spatial stream 314 and the second OFDM symbol in time 345, e.g., as described below.

In some demonstrative embodiments, a signal band of the OFDM symbols 315 and 345 in spatial streams 314 and 344 may be divided into first and second sub-bands.

In some demonstrative embodiments, for example, as shown in FIG. 3, OFDM symbols 315 and 345 may each have a signal band including 336 subcarriers (tones).

In some demonstrative embodiments, as shown in FIG. 3, for example, a first sub-band 316 of a signal band of the first OFDM symbol 315 may include a first subset of the subcarriers, e.g., including 168 subcarriers, and a second sub-band 318 of the signal band of the first OFDM symbol 315 may include a second subset of the subcarriers, e.g., including 168 subcarriers.

In some demonstrative embodiments, as shown in FIG. 3, for example, a first sub-band 346 of a signal band of the second OFDM symbol 345 may include a first subset of the subcarriers, e.g., including 168 subcarriers, and a second sub-band 348 of the signal band of the second OFDM symbol 345 may include a second subset of the subcarriers, e.g., including 168 subcarriers.

In some demonstrative embodiments, as shown in FIG. 3, space-frequency mapping scheme 300 may be configured to map a first pair of data symbols of data block 308, e.g., the pair of symbols 310 and 312, to a first pair of respective subcarriers of the first OFDM symbol 315 in the first spatial stream 314, e.g., the pair of data subcarriers 320 and 322.

In some demonstrative embodiments, as shown in FIG. 3, space-frequency mapping scheme 300 may be configured to map a second pair of data symbols of data block 342, e.g., the pair of symbols 340 and 342, to the first pair of respective subcarriers of the first OFDM symbol 315 in the second spatial stream 344, e.g., to the pair of data subcarriers 350 and 352.

In some demonstrative embodiments, as shown in FIG. 3, space-frequency mapping scheme 300 may be configured to map a complex conjugate of the first pair of data symbols, e.g., the pair of symbols 310 and 312, to a second pair of respective subcarriers of the second OFDM symbol 345 in the second spatial stream 344, e.g., the pair of data subcarriers 387 and 389.

In some demonstrative embodiments, as shown in FIG. 3, space-frequency mapping scheme 300 may be configured to map a sign-inversed complex conjugate of the second pair of data symbols, e.g., the pair of data symbols 340 and 342, to the second pair of respective subcarriers of the second OFDM symbol 345 in the first spatial stream 314, e.g., the pair of data subcarriers 377 and 379.

In some demonstrative embodiments, space-frequency mapping scheme 300 may be configured to map a k-th symbol of data block 308, e.g., the symbol 310, to a k-th subcarrier, e.g., the subcarrier 320, of OFDM symbol 315 in spatial stream 314, and/or to map a (k+1)-th symbol of data block 308, e.g., the symbol 312, to a P(k)-th subcarrier of OFDM symbol 315 in spatial stream 314.

In some demonstrative embodiments, space-frequency mapping scheme 300 may be configured to map a k-th symbol of data block 338, e.g., the symbol 340, to a k-th subcarrier, e.g., the subcarrier 350, of OFDM symbol 315 in spatial stream 344, and/or to map a (k+1)-th symbol of data block 338, e.g., the symbol 342, to a P(k)-th subcarrier of OFDM symbol 315 in spatial stream 344.

In some demonstrative embodiments, the permutation P(K) may include an STP permutation, a DTP permutation, or any other permutation, e.g., as described above.

In some demonstrative embodiments, space-frequency mapping scheme 300 may be configured to map a complex conjugate of the k-th symbol of data block 308, e.g., the symbol 310, to a k-th subcarrier, e.g., the subcarrier 387, of OFDM symbol 345 in spatial stream 344, and/or to map a complex conjugate of the (k+1)-th symbol of data block 308, e.g., the symbol 312, to a P(k)-th subcarrier of OFDM symbol 345 in spatial stream 344.

In some demonstrative embodiments, space-frequency mapping scheme 300 may be configured to map a sign-inversed complex conjugate of the k-th symbol of data block 338, e.g., the symbol 340, to a k-th subcarrier, e.g., the subcarrier 377, of OFDM symbol 345 in spatial stream 314, and/or to map a sign-inversed complex conjugate of the (k+1)-th symbol of data block 308, e.g., the symbol 342, to a P(k)-th subcarrier of OFDM symbol 345 in spatial stream 314.

In some demonstrative embodiments, the space-frequency diversity mapping scheme 300 may allow, for example, providing spatial diversity, for example, in addition to exploiting channel frequency diversity, and/or avoiding data loss due to deep notches in the frequency domain.

In some demonstrative embodiments, the space-frequency diversity mapping scheme 300 may allow, for example, operation, for example, even when one of the spatial streams 314 and 344 is attenuated, e.g., due to blockage or any other reason, while another spatial stream of streams 314 and 344 survives and has enough quality.

In some demonstrative embodiments, the spatial diversity achieved by the space-frequency diversity mapping scheme 300 may allow, for example, robust transmission, for example, even without re-beamforming of the communication link, for example, in case when a blockage event is temporary, e.g., due to movement in the area of communication.

Referring back to FIG. 1, in some demonstrative embodiments, controller 154 may be configured to cause, trigger, and/or control a wireless station implemented by device 140 to process a MIMO transmission received from another station, for example, the station implemented by device 102, e.g., as described below.

In some demonstrative embodiments, the received MIMO transmission may include a plurality of spatial streams representing a plurality of data bit sequences, e.g., as described above.

In some demonstrative embodiments, controller 154 may be configured to cause, trigger, and/or control the wireless station implemented by device 140 to process the received MIMO transmission, for example, in accordance with the space-frequency diversity mapping scheme 300 (FIG. 3), e.g., as described below.

In some demonstrative embodiments, controller 154 may include, operate as, and/or perform the functionality of a demapper 157, which may be configured to process the plurality of spatial streams to determine a plurality of data blocks, e.g., as described below.

In some demonstrative embodiments, demapper 157 may be configured to determine a first pair of consecutive symbols in a first data block of the plurality of data blocks and a second pair of consecutive symbols in a second data block of the plurality of data blocks, for example, based on pairs of subcarriers in first and second OFDM symbols, for example, from the first and second data streams, e.g., as described below.

In some demonstrative embodiments, demapper 157 may be configured to determine the first and second pairs of symbols, for example, based on a space-time combining scheme, e.g., an Alamouti combining scheme.

In some demonstrative embodiments, demapper 157 may be configured to determine the first pair of data symbols, for example, based on a first pair of subcarriers of a first OFDM symbol in a first spatial stream, e.g., the k-th and P(K)-th subcarriers of OFDM symbol 315 (FIG. 3) in stream 314 (FIG. 3), and a second pair of subcarriers of a second OFDM symbol in a second spatial stream, e.g., the k-th and P(K)-th subcarriers of OFDM symbol 345 (FIG. 3) in stream 344 (FIG. 3).

In some demonstrative embodiments, demapper 157 may be configured to determine the second pair of data symbols, for example, based on the first pair of subcarriers of the first OFDM symbol in the second spatial stream, e.g., the k-th and P(K)-th subcarriers of OFDM symbol 315 (FIG. 3) in stream 344 (FIG. 3), and the second pair of subcarriers of the second OFDM symbol in the first spatial stream, e.g., the k-th and P(K)-th subcarriers of OFDM symbol 345 (FIG. 3) in stream 314 (FIG. 3).

In some demonstrative embodiments, demapper 157 may be configured, for example, to apply an Alamouti combining scheme to combine the symbols $X_0$ and $Y_0$ and their repeated counterparts, and/or to apply an Alamouti combining scheme to combine the symbols $X_1$ and $Y_1$ and their repeated counterparts, e.g., as described above with reference to FIG. 3.

In some demonstrative embodiments, controller 154 may include, operate as, and/or perform the functionality of a DCM module 159, which may be configured to determine the plurality of data bit sequences based on the plurality of data blocks, for example, by determining a first data bit sequence of the plurality of data bit sequences based on the first pair of data symbols, and/or determining a second data bit sequence of the plurality of data bit sequences based on the second pair of data symbols.

In some demonstrative embodiments, DCM module 159 may be configured to demodulate the transmission, for example, by demodulating the symbol pairs $(X_0, X_1)$ and $(Y_0, Y_1)$, for example, according to a DCM scheme, e.g., according to a DCM scheme implemented by a sender of the transmission.

In some demonstrative embodiments, DCM module 159 may be configured to determine the plurality of data bit sequences according to an SQPSK DCM scheme, e.g., as described above.

In some demonstrative embodiments, DCM module 159 may be configured to determine the plurality of data bit sequences according to an QPSK DCM scheme, e.g., as described above.

In some demonstrative embodiments, DCM module 159 may be configured to determine the plurality of data bit sequences according to any other dual-carrier or multi-carrier modulation scheme, e.g., as described above.

Figure 4:
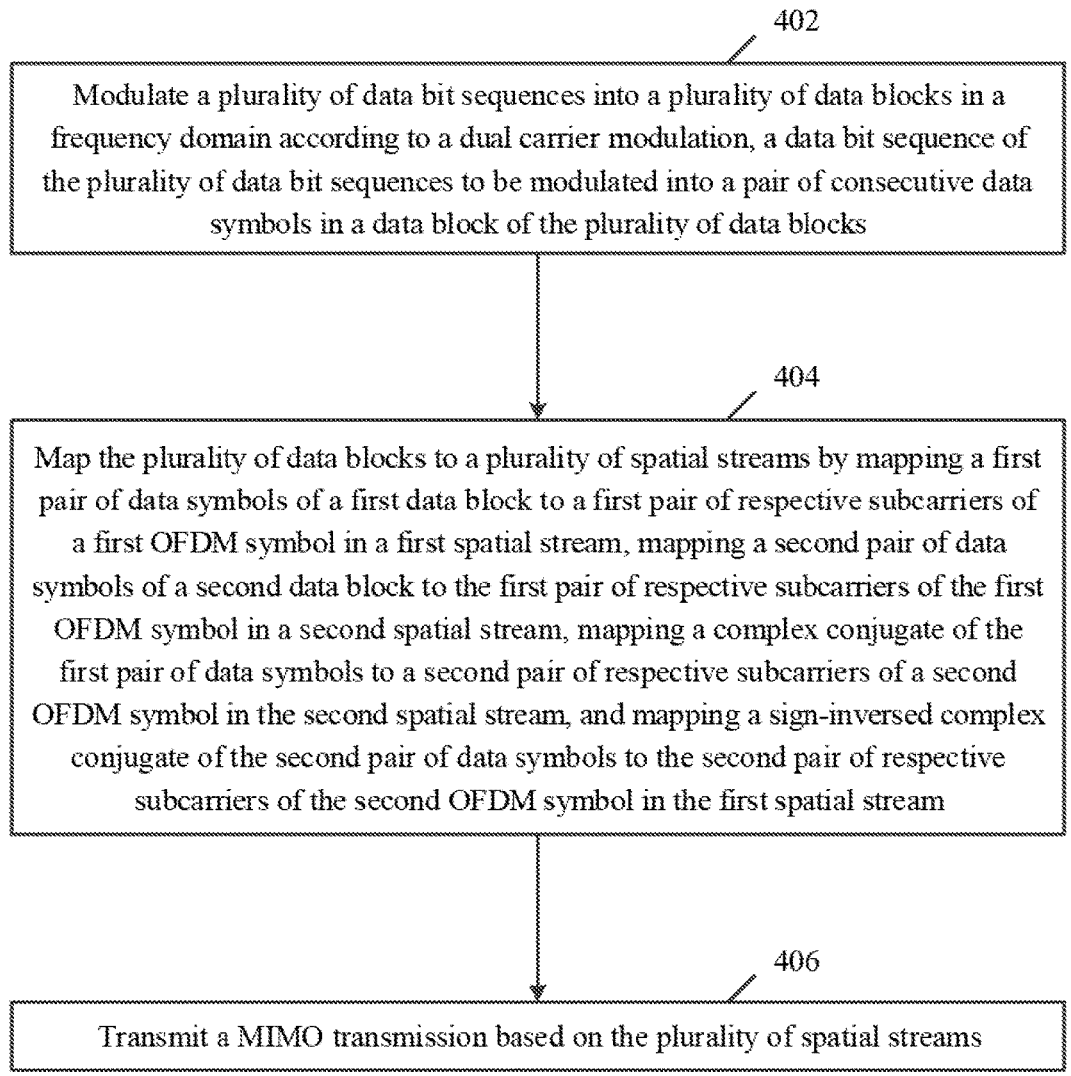
FIG. 4 is a schematic flow-chart illustration of a method of transmitting a transmission according to a transmit space-frequency diversity scheme, in accordance with some demonstrative embodiments.

Reference is made to FIG. 4, which schematically illustrates a method of transmitting a transmission according to a transmit space-frequency diversity scheme, in accordance with some demonstrative embodiments. For example, one or more of the operations of the method of FIG. 4 may be performed by one or more elements of a system, e.g., system 100 (FIG. 1), for example, one or more wireless devices, e.g., device 102 (FIG. 1), and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 402, the method may include modulating a plurality of data bit sequences into a plurality of data blocks in a frequency domain according to a dual carrier modulation. For example, a data bit sequence of the plurality of data bit sequences may be modulated into a pair of consecutive data symbols in a data block of the plurality of data blocks. For example, controller 124 (FIG. 1) may be configured to cause, trigger, and/or control the wireless station implemented by device 102 (FIG. 1) to modulate the plurality of data bit sequences corresponding to data to be transmitted into a plurality of data blocks in the frequency domain, e.g., as described above.

As indicated at block 404, the method may include mapping the plurality of data blocks to a plurality of spatial streams by mapping a first pair of data symbols of a first data block to a first pair of respective subcarriers of a first OFDM symbol in a first spatial stream, mapping a second pair of data symbols of a second data block to the first pair of respective subcarriers of the first OFDM symbol in a second spatial stream, mapping a complex conjugate of the first pair of data symbols to a second pair of respective subcarriers of a second OFDM symbol in the second spatial stream, and mapping a sign-inversed complex conjugate of the second pair of data symbols to the second pair of respective subcarriers of the second OFDM symbol in the first spatial stream. For example, controller 124 (FIG. 1) may be configured to cause, trigger, and/or control the wireless station implemented by device 102 (FIG. 1) to map the plurality of data blocks to a plurality of spatial streams, for example, according to the space-frequency diversity mapping scheme 300 (FIG. 3), e.g., as described above.

As indicated at block 406, the method may include transmitting a MIMO transmission based on the plurality of spatial streams. For example, controller 124 (FIG. 1) may be configured to cause, trigger, and/or control the wireless station implemented by device 102 (FIG. 1) to transmit the MIMO transmission based on the plurality of spatial streams, e.g., as described above.

Figure 5:
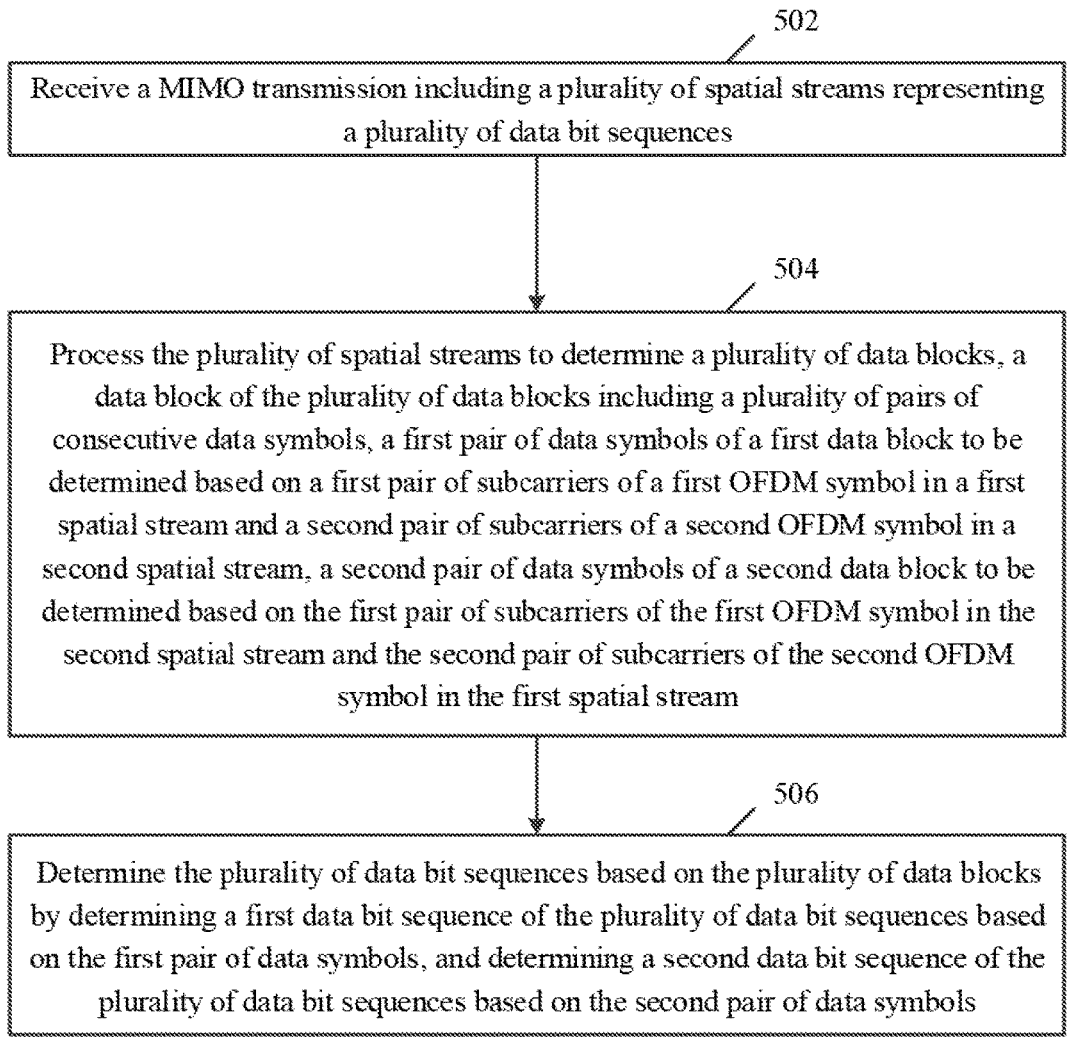
FIG. 5 is a schematic flow-chart illustration of a method of processing a received transmission according to a transmit space-frequency diversity scheme, in accordance with some demonstrative embodiments.

Reference is made to FIG. 5, which schematically illustrates a method of processing a received transmission according to a transmit space-frequency diversity scheme, in accordance with some demonstrative embodiments. For example, one or more of the operations of the method of FIG. 5 may be performed by one or more elements of a system, e.g., system 100 (FIG. 1), for example, one or more wireless devices, e.g., device 102 (FIG. 1), and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 502, the method may include receiving a MIMO transmission including a plurality of spatial streams representing a plurality of data bit sequences. For example, controller 154 (FIG. 1) may be configured to cause, trigger, and/or control the wireless station implemented by device 140 (FIG. 1) to receive from device 102 (FIG. 1) the MIMO transmission including the plurality of spatial streams, e.g., as described above.

As indicated at block 504, the method may include processing the plurality of spatial streams to determine a plurality of data blocks. For example, a data block of the plurality of data blocks may include a plurality of pairs of consecutive data symbols. For example, a first pair of data symbols of a first data block may be determined based on a first pair of subcarriers of a first OFDM symbol in a first spatial stream and a second pair of subcarriers of a second OFDM symbol in a second spatial stream, and/or a second pair of data symbols of a second data block may be determined based on the first pair of subcarriers of the first OFDM symbol in the second spatial stream and the second pair of subcarriers of the second OFDM symbol in the first spatial stream. For example, controller 154 (FIG. 1) may be configured to cause, trigger, and/or control the wireless station implemented by device 140 (FIG. 1) to determine the first and second pairs of data symbols, based on the pairs of data subcarriers in the first and second OFDM symbols of the first and second spatial streams, for example, in accordance with the space-frequency diversity mapping scheme 300 (FIG. 3), e.g., as described above.

As indicated at block 506, the method may include determining the plurality of data bit sequences based on the plurality of data blocks, for example, by determining a first data bit sequence of the plurality of data bit sequences based on the first pair of data symbols, and/or determining a second data bit sequence of the plurality of data bit sequences based on the second pair of data symbols. For example, controller 154 (FIG. 1) may be configured to cause, trigger, and/or control the wireless station implemented by device 140 (FIG. 1) to determine the plurality of data bit sequences based on the plurality of data blocks, e.g., as described above.

Figure 6:
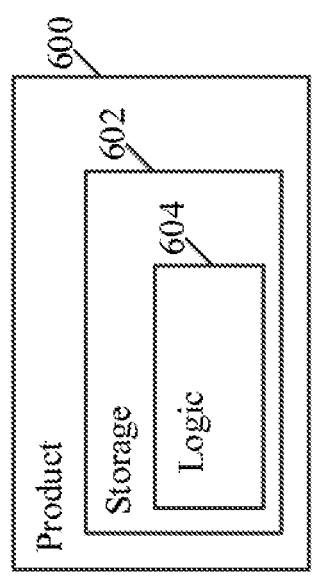
FIG. 6 is a schematic illustration of a product of manufacture, in accordance with some demonstrative embodiments.

Reference is made to FIG. 6, which schematically illustrates a product of manufacture 600, in accordance with some demonstrative embodiments. Product 600 may include one or more tangible computer-readable non-transitory storage media 602, which may include computer-executable instructions, e.g., implemented by logic 604, operable to, when executed by at least one computer processor, enable the at least one computer processor to implement one or more operations at devices 102 and/or 140 (FIG. 1), transmitters 118 and/or 148 (FIG. 1), receivers 116 and/or 146 (FIG. 1), controllers 124 and/or 154 (FIG. 1), message processors 128 (FIG. 1) and/or 158 (FIG. 1), and/or to perform, trigger and/or implement one or more operations and/or functionalities, for example, one or more operations and/or functionalities described above, e.g., with reference to FIGS. 1, 2, 3, 4 and/or 5. The phrase "non-transitory machine-readable medium" is directed to include all computer-readable media, with the sole exception being a transitory propagating signal.

In some demonstrative embodiments, product 600 and/or storage media 602 may include one or more types of computer-readable storage media capable of storing data, including volatile memory, non-volatile memory, removable or non-removable memory, erasable or non-erasable memory, writeable or re-writeable memory, and the like. For example, storage media 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a wireless station to modulate a plurality of data bit sequences into a plurality of data blocks in a frequency domain according to a dual carrier modulation, a data bit sequence of the plurality of data bit sequences to be modulated into a pair of consecutive data symbols in a data block of the plurality of data blocks; map the plurality of data blocks to a plurality of spatial streams by mapping a first pair of data symbols of a first data block to a first pair of respective subcarriers of a first Orthogonal Frequency Division Multiplexing (OFDM) symbol in a first spatial stream, mapping a second pair of data symbols of a second data block to the first pair of respective subcarriers of the first OFDM symbol in a second spatial stream, mapping a complex conjugate of the first pair of data symbols to a second pair of respective subcarriers of a second OFDM symbol in the second spatial stream, and mapping a sign-inversed complex conjugate of the second pair of data symbols to the second pair of respective subcarriers of the second OFDM symbol in the first spatial stream; and transmit a Multi-In-Multi-Out (MIMO) transmission based on the plurality of spatial streams.

Example 2 includes the subject matter of Example 1, and optionally, wherein the first pair of subcarriers comprises a first subcarrier in a first sub-band of a signal band of the first OFDM symbol, and a second subcarrier in a second sub-band of the signal band of the first OFDM symbol, and the second pair of subcarriers comprises a third subcarrier in a first sub-band of a signal band of the second OFDM symbol, and a fourth subcarrier in a second sub-band of the signal band of the second OFDM symbol.

Example 3 includes the subject matter of Example 2, and optionally, wherein the first pair of data symbols comprises a k-th symbol and a (k+1)-th symbol in the first data block, the second pair of data symbols comprises a k-th symbol and a (k+1)-th symbol in the second data block, the first subcarrier comprises a k-th subcarrier in the first sub-band of the first OFDM symbol, the second subcarrier comprises a P(k)-th subcarrier in the second sub-band of the first OFDM symbol, the third subcarrier comprises a k-th data subcarrier in the first sub-band of the second OFDM symbol, and the fourth subcarrier comprises a P(k)-th subcarrier in the second sub-band of the second OFDM symbol, wherein P(k) is a predefined permutation of k.

Example 4 includes the subject matter of Example 3, and optionally, wherein P(k) comprises a Static Tone Pairing (STP) permutation.

Example 5 includes the subject matter of Example 3, and optionally, wherein P(k) comprises a Dynamic Tone Pairing (DTP) permutation.

Example 6 includes the subject matter of any one of Examples 2-5, and optionally, wherein the first sub-band of the first OFDM symbol comprises a first half of the signal band of the first OFDM symbol, the second sub-band of the first OFDM symbol comprises a second half of the signal band of the first OFDM symbol, the first sub-band of the second OFDM symbol comprises a first half of the signal band of the second OFDM symbol, and the second sub-band of the second OFDM symbol comprises a second half of the signal band of the second OFDM symbol.

Example 7 includes the subject matter of any one of Examples 1-6, and optionally, wherein the dual carrier modulation comprises a Staggered Quadrature Phase-Shift Keying (SQPSK) Dual Carrier Modulation (DCM).

Example 8 includes the subject matter of Example 7, and optionally, wherein the data bit sequence comprises two data bits.

Example 9 includes the subject matter of Example 7 or 8, and optionally, wherein the pair of consecutive data symbols comprises a pair of Quadrature Phase-Shift Keying (QPSK) constellation points.

Example 10 includes the subject matter of Example 9, and optionally, wherein the pair of QPSK constellation points comprises a first constellation point, and a second constellation point comprising a complex conjugate of the first constellation point.

Example 11 includes the subject matter of any one of Examples 1-6, and optionally, wherein the dual carrier modulation comprises a Quadrature Phase-Shift Keying (QPSK) Dual Carrier Modulation (DCM).

Example 12 includes the subject matter of Example 11, and optionally, wherein the data bit sequence comprises four data bits.

Example 13 includes the subject matter of Example 12, and optionally, wherein the apparatus is configured to cause the wireless station to map first and second data bits of the four data bits to a first QPSK constellation point, to map third and fourth data bits of the four data bits to a second QPSK constellation point, and to map the first and second QPSK constellation points to first and second 16 Quadrature Amplitude Modulation (16QAM) constellation points, the pair of consecutive data symbols comprising the first 16QAM constellation point and the second 16QAM constellation point.

Example 14 includes the subject matter of any one of Examples 1-13, and optionally, wherein the MIMO transmission comprises a 2×N MIMO transmission comprising two spatial transmit streams via two antennas.

Example 15 includes the subject matter of any one of Examples 1-14, and optionally, wherein the apparatus is configured to cause the wireless station to transmit the MIMO transmission over a Directional Multi-Gigabit (DMG) band.

Example 16 includes the subject matter of any one of Examples 1-15, and optionally, wherein the wireless station is a Directional Multi-Gigabit (DMG) Station (STA).

Example 17 includes the subject matter of any one of Examples 1-16, and optionally, comprising a plurality of directional antennas to transmit the plurality of spatial streams.

Example 18 includes the subject matter of any one of Examples 1-17, and optionally, comprising a radio, a memory, and a processor.

Example 19 includes a system of wireless communication comprising a wireless station, the wireless station comprising a plurality of directional antennas; a radio; a memory; a processor; and a controller configured to cause the wireless station to modulate a plurality of data bit sequences into a plurality of data blocks in a frequency domain according to a dual carrier modulation, a data bit sequence of the plurality of data bit sequences to be modulated into a pair of consecutive data symbols in a data block of the plurality of data blocks; map the plurality of data blocks to a plurality of spatial streams by mapping a first pair of data symbols of a first data block to a first pair of respective subcarriers of a first Orthogonal Frequency Division Multiplexing (OFDM) symbol in a first spatial stream, mapping a second pair of data symbols of a second data block to the first pair of respective subcarriers of the first OFDM symbol in a second spatial stream, mapping a complex conjugate of the first pair of data symbols to a second pair of respective subcarriers of a second OFDM symbol in the second spatial stream, and mapping a sign-inversed complex conjugate of the second pair of data symbols to the second pair of respective subcarriers of the second OFDM symbol in the first spatial stream; and transmit a Multi-In-Multi-Out (MIMO) transmission based on the plurality of spatial streams.

Example 20 includes the subject matter of Example 19, and optionally, wherein the first pair of subcarriers comprises a first subcarrier in a first sub-band of a signal band of the first OFDM symbol, and a second subcarrier in a second sub-band of the signal band of the first OFDM symbol, and the second pair of subcarriers comprises a third subcarrier in a first sub-band of a signal band of the second OFDM symbol, and a fourth subcarrier in a second sub-band of the signal band of the second OFDM symbol.

Example 21 includes the subject matter of Example 20, and optionally, wherein the first pair of data symbols comprises a k-th symbol and a (k+1)-th symbol in the first data block, the second pair of data symbols comprises a k-th symbol and a (k+1)-th symbol in the second data block, the first subcarrier comprises a k-th subcarrier in the first sub-band of the first OFDM symbol, the second subcarrier comprises a P(k)-th subcarrier in the second sub-band of the first OFDM symbol, the third subcarrier comprises a k-th data subcarrier in the first sub-band of the second OFDM symbol, and the fourth subcarrier comprises a P(k)-th subcarrier in the second sub-band of the second OFDM symbol, wherein P(k) is a predefined permutation of k.

Example 22 includes the subject matter of Example 21, and optionally, wherein P(k) comprises a Static Tone Pairing (STP) permutation.

Example 23 includes the subject matter of Example 21, and optionally, wherein P(k) comprises a Dynamic Tone Pairing (DTP) permutation.

Example 24 includes the subject matter of any one of Examples 20-23, and optionally, wherein the first sub-band of the first OFDM symbol comprises a first half of the signal band of the first OFDM symbol, the second sub-band of the first OFDM symbol comprises a second half of the signal band of the first OFDM symbol, the first sub-band of the second OFDM symbol comprises a first half of the signal band of the second OFDM symbol, and the second sub-band of the second OFDM symbol comprises a second half of the signal band of the second OFDM symbol.

Example 25 includes the subject matter of any one of Examples 19-24, and optionally, wherein the dual carrier modulation comprises a Staggered Quadrature Phase-Shift Keying (SQPSK) Dual Carrier Modulation (DCM).

Example 26 includes the subject matter of Example 25, and optionally, wherein the data bit sequence comprises two data bits.

Example 27 includes the subject matter of Example 25 or 26, and optionally, wherein the pair of consecutive data symbols comprises a pair of Quadrature Phase-Shift Keying (QPSK) constellation points.

Example 28 includes the subject matter of Example 27, and optionally, wherein the pair of QPSK constellation points comprises a first constellation point, and a second constellation point comprising a complex conjugate of the first constellation point.

Example 29 includes the subject matter of any one of Examples 19-24, and optionally, wherein the dual carrier modulation comprises a Quadrature Phase-Shift Keying (QPSK) Dual Carrier Modulation (DCM).

Example 30 includes the subject matter of Example 29, and optionally, wherein the data bit sequence comprises four data bits.

Example 31 includes the subject matter of Example 30, and optionally, wherein the controller is configured to cause the wireless station to map first and second data bits of the four data bits to a first QPSK constellation point, to map third and fourth data bits of the four data bits to a second QPSK constellation point, and to map the first and second QPSK constellation points to first and second 16 Quadrature Amplitude Modulation (16QAM) constellation points, the pair of consecutive data symbols comprising the first 16QAM constellation point and the second 16QAM constellation point.

Example 32 includes the subject matter of any one of Examples 19-31, and optionally, wherein the MIMO transmission comprises a 2×N MIMO transmission comprising two spatial transmit streams via two antennas.

Example 33 includes the subject matter of any one of Examples 19-32, and optionally, wherein the controller is configured to cause the wireless station to transmit the MIMO transmission over a Directional Multi-Gigabit (DMG) band.

Example 34 includes the subject matter of any one of Examples 19-33, and optionally, wherein the wireless station is a Directional Multi-Gigabit (DMG) Station (STA).

Example 35 includes a method to be performed at a wireless station, the method comprising modulating a plurality of data bit sequences into a plurality of data blocks in a frequency domain according to a dual carrier modulation, a data bit sequence of the plurality of data bit sequences to be modulated into a pair of consecutive data symbols in a data block of the plurality of data blocks; mapping the plurality of data blocks to a plurality of spatial streams by mapping a first pair of data symbols of a first data block to a first pair of respective subcarriers of a first Orthogonal Frequency Division Multiplexing (OFDM) symbol in a first spatial stream, mapping a second pair of data symbols of a second data block to the first pair of respective subcarriers of the first OFDM symbol in a second spatial stream, mapping a complex conjugate of the first pair of data symbols to a second pair of respective subcarriers of a second OFDM symbol in the second spatial stream, and mapping a sign-inversed complex conjugate of the second pair of data symbols to the second pair of respective subcarriers of the second OFDM symbol in the first spatial stream; and transmitting a Multi-In-Multi-Out (MIMO) transmission based on the plurality of spatial streams.

Example 36 includes the subject matter of Example 35, and optionally, wherein the first pair of subcarriers comprises a first subcarrier in a first sub-band of a signal band of the first OFDM symbol, and a second subcarrier in a second sub-band of the signal band of the first OFDM symbol, and the second pair of subcarriers comprises a third subcarrier in a first sub-band of a signal band of the second OFDM symbol, and a fourth subcarrier in a second sub-band of the signal band of the second OFDM symbol.

Example 37 includes the subject matter of Example 36, and optionally, wherein the first pair of data symbols comprises a k-th symbol and a (k+1)-th symbol in the first data block, the second pair of data symbols comprises a k-th symbol and a (k+1)-th symbol in the second data block, the first subcarrier comprises a k-th subcarrier in the first sub-band of the first OFDM symbol, the second subcarrier comprises a P(k)-th subcarrier in the second sub-band of the first OFDM symbol, the third subcarrier comprises a k-th data subcarrier in the first sub-band of the second OFDM symbol, and the fourth subcarrier comprises a P(k)-th subcarrier in the second sub-band of the second OFDM symbol, wherein P(k) is a predefined permutation of k.

Example 38 includes the subject matter of Example 37, and optionally, wherein P(k) comprises a Static Tone Pairing (STP) permutation.

Example 39 includes the subject matter of Example 37, and optionally, wherein P(k) comprises a Dynamic Tone Pairing (DTP) permutation.

Example 40 includes the subject matter of any one of Examples 36-39, and optionally, wherein the first sub-band of the first OFDM symbol comprises a first half of the signal band of the first OFDM symbol, the second sub-band of the first OFDM symbol comprises a second half of the signal band of the first OFDM symbol, the first sub-band of the second OFDM symbol comprises a first half of the signal band of the second OFDM symbol, and the second sub-band of the second OFDM symbol comprises a second half of the signal band of the second OFDM symbol.

Example 41 includes the subject matter of any one of Examples 35-40, and optionally, wherein the dual carrier modulation comprises a Staggered Quadrature Phase-Shift Keying (SQPSK) Dual Carrier Modulation (DCM).

Example 42 includes the subject matter of Example 41, and optionally, wherein the data bit sequence comprises two data bits.

Example 43 includes the subject matter of Example 41 or 42, and optionally, wherein the pair of consecutive data symbols comprises a pair of Quadrature Phase-Shift Keying (QPSK) constellation points.

Example 44 includes the subject matter of Example 43, and optionally, wherein the pair of QPSK constellation points comprises a first constellation point, and a second constellation point comprising a complex conjugate of the first constellation point.

Example 45 includes the subject matter of any one of Examples 35-40, and optionally, wherein the dual carrier modulation comprises a Quadrature Phase-Shift Keying (QPSK) Dual Carrier Modulation (DCM).

Example 46 includes the subject matter of Example 45, and optionally, wherein the data bit sequence comprises four data bits.

Example 47 includes the subject matter of Example 46, and optionally, comprising mapping first and second data bits of the four data bits to a first QPSK constellation point, mapping third and fourth data bits of the four data bits to a second QPSK constellation point, and mapping the first and second QPSK constellation points to first and second 16 Quadrature Amplitude Modulation (16QAM) constellation points, the pair of consecutive data symbols comprising the first 16QAM constellation point and the second 16QAM constellation point.

Example 48 includes the subject matter of any one of Examples 35-47, and optionally, wherein the MIMO transmission comprises a 2×N MIMO transmission comprising two spatial transmit streams via two antennas.

Example 49 includes the subject matter of any one of Examples 35-48, and optionally, comprising transmitting the MIMO transmission over a Directional Multi-Gigabit (DMG) band.

Example 50 includes the subject matter of any one of Examples 35-49, and optionally, wherein the wireless station is a Directional Multi-Gigabit (DMG) Station (STA).

Example 51 includes a product comprising one or more tangible computer-readable non-transitory storage media comprising computer-executable instructions operable to, when executed by at least one computer processor, enable the at least one computer processor to implement operations at a wireless station, the operations comprising modulating a plurality of data bit sequences into a plurality of data blocks in a frequency domain according to a dual carrier modulation, a data bit sequence of the plurality of data bit sequences to be modulated into a pair of consecutive data symbols in a data block of the plurality of data blocks; mapping the plurality of data blocks to a plurality of spatial streams by mapping a first pair of data symbols of a first data block to a first pair of respective subcarriers of a first Orthogonal Frequency Division Multiplexing (OFDM) symbol in a first spatial stream, mapping a second pair of data symbols of a second data block to the first pair of respective subcarriers of the first OFDM symbol in a second spatial stream, mapping a complex conjugate of the first pair of data symbols to a second pair of respective subcarriers of a second OFDM symbol in the second spatial stream, and mapping a sign-inversed complex conjugate of the second pair of data symbols to the second pair of respective subcarriers of the second OFDM symbol in the first spatial stream; and transmitting a Multi-In-Multi-Out (MIMO) transmission based on the plurality of spatial streams.

Example 52 includes the subject matter of Example 51, and optionally, wherein the first pair of subcarriers comprises a first subcarrier in a first sub-band of a signal band of the first OFDM symbol, and a second subcarrier in a second sub-band of the signal band of the first OFDM symbol, and the second pair of subcarriers comprises a third subcarrier in a first sub-band of a signal band of the second OFDM symbol, and a fourth subcarrier in a second sub-band of the signal band of the second OFDM symbol.

Example 53 includes the subject matter of Example 52, and optionally, wherein the first pair of data symbols comprises a k-th symbol and a (k+1)-th symbol in the first data block, the second pair of data symbols comprises a k-th symbol and a (k+1)-th symbol in the second data block, the first subcarrier comprises a k-th subcarrier in the first sub-band of the first OFDM symbol, the second subcarrier comprises a P(k)-th subcarrier in the second sub-band of the first OFDM symbol, the third subcarrier comprises a k-th data subcarrier in the first sub-band of the second OFDM symbol, and the fourth subcarrier comprises a P(k)-th subcarrier in the second sub-band of the second OFDM symbol, wherein P(k) is a predefined permutation of k.

Example 54 includes the subject matter of Example 53, and optionally, wherein P(k) comprises a Static Tone Pairing (STP) permutation.

Example 55 includes the subject matter of Example 53, and optionally, wherein P(k) comprises a Dynamic Tone Pairing (DTP) permutation.

Example 56 includes the subject matter of any one of Examples 52-55, and optionally, wherein the first sub-band of the first OFDM symbol comprises a first half of the signal band of the first OFDM symbol, the second sub-band of the first OFDM symbol comprises a second half of the signal band of the first OFDM symbol, the first sub-band of the second OFDM symbol comprises a first half of the signal band of the second OFDM symbol, and the second sub-band of the second OFDM symbol comprises a second half of the signal band of the second OFDM symbol.

Example 57 includes the subject matter of any one of Examples 51-56, and optionally, wherein the dual carrier modulation comprises a Staggered Quadrature Phase-Shift Keying (SQPSK) Dual Carrier Modulation (DCM).

Example 58 includes the subject matter of Example 57, and optionally, wherein the data bit sequence comprises two data bits.

Example 59 includes the subject matter of Example 57 or 58, and optionally, wherein the pair of consecutive data symbols comprises a pair of Quadrature Phase-Shift Keying (QPSK) constellation points.

Example 60 includes the subject matter of Example 59, and optionally, wherein the pair of QPSK constellation points comprises a first constellation point, and a second constellation point comprising a complex conjugate of the first constellation point.

Example 61 includes the subject matter of any one of Examples 51-56, and optionally, wherein the dual carrier modulation comprises a Quadrature Phase-Shift Keying (QPSK) Dual Carrier Modulation (DCM).

Example 62 includes the subject matter of Example 61, and optionally, wherein the data bit sequence comprises four data bits.

Example 63 includes the subject matter of Example 62, and optionally, wherein the operations comprise mapping first and second data bits of the four data bits to a first QPSK constellation point, mapping third and fourth data bits of the four data bits to a second QPSK constellation point, and mapping the first and second QPSK constellation points to first and second 16 Quadrature Amplitude Modulation (16QAM) constellation points, the pair of consecutive data symbols comprising the first 16QAM constellation point and the second 16QAM constellation point.

Example 64 includes the subject matter of any one of Examples 51-63, and optionally, wherein the MIMO transmission comprises a 2×N MIMO transmission comprising two spatial transmit streams via two antennas.

Example 65 includes the subject matter of any one of Examples 51-64, and optionally, wherein the operations comprise transmitting the MIMO transmission over a Directional Multi-Gigabit (DMG) band.

Example 66 includes the subject matter of any one of Examples 51-65, and optionally, wherein the wireless station is a Directional Multi-Gigabit (DMG) Station (STA).

Example 67 includes an apparatus of a wireless station, the apparatus comprising means for modulating a plurality of data bit sequences into a plurality of data blocks in a frequency domain according to a dual carrier modulation, a data bit sequence of the plurality of data bit sequences to be modulated into a pair of consecutive data symbols in a data block of the plurality of data blocks; means for mapping the plurality of data blocks to a plurality of spatial streams by mapping a first pair of data symbols of a first data block to a first pair of respective subcarriers of a first Orthogonal Frequency Division Multiplexing (OFDM) symbol in a first spatial stream, mapping a second pair of data symbols of a second data block to the first pair of respective subcarriers of the first OFDM symbol in a second spatial stream, mapping a complex conjugate of the first pair of data symbols to a second pair of respective subcarriers of a second OFDM symbol in the second spatial stream, and mapping a sign-inversed complex conjugate of the second pair of data symbols to the second pair of respective subcarriers of the second OFDM symbol in the first spatial stream; and means for transmitting a Multi-In-Multi-Out (MIMO) transmission based on the plurality of spatial streams.

Example 68 includes the subject matter of Example 67, and optionally, wherein the first pair of subcarriers comprises a first subcarrier in a first sub-band of a signal band of the first OFDM symbol, and a second subcarrier in a second sub-band of the signal band of the first OFDM symbol, and the second pair of subcarriers comprises a third subcarrier in a first sub-band of a signal band of the second OFDM symbol, and a fourth subcarrier in a second sub-band of the signal band of the second OFDM symbol.

Example 69 includes the subject matter of Example 68, and optionally, wherein the first pair of data symbols comprises a k-th symbol and a (k+1)-th symbol in the first data block, the second pair of data symbols comprises a k-th symbol and a (k+1)-th symbol in the second data block, the first subcarrier comprises a k-th subcarrier in the first sub-band of the first OFDM symbol, the second subcarrier comprises a P(k)-th subcarrier in the second sub-band of the first OFDM symbol, the third subcarrier comprises a k-th data subcarrier in the first sub-band of the second OFDM symbol, and the fourth subcarrier comprises a P(k)-th subcarrier in the second sub-band of the second OFDM symbol, wherein P(k) is a predefined permutation of k.

Example 70 includes the subject matter of Example 69, and optionally, wherein P(k) comprises a Static Tone Pairing (STP) permutation.

Example 71 includes the subject matter of Example 69, and optionally, wherein P(k) comprises a Dynamic Tone Pairing (DTP) permutation.

Example 72 includes the subject matter of any one of Examples 68-71, and optionally, wherein the first sub-band of the first OFDM symbol comprises a first half of the signal band of the first OFDM symbol, the second sub-band of the first OFDM symbol comprises a second half of the signal band of the first OFDM symbol, the first sub-band of the second OFDM symbol comprises a first half of the signal band of the second OFDM symbol, and the second sub-band of the second OFDM symbol comprises a second half of the signal band of the second OFDM symbol.

Example 73 includes the subject matter of any one of Examples 67-72, and optionally, wherein the dual carrier modulation comprises a Staggered Quadrature Phase-Shift Keying (SQPSK) Dual Carrier Modulation (DCM).

Example 74 includes the subject matter of Example 73, and optionally, wherein the data bit sequence comprises two data bits.

Example 75 includes the subject matter of Example 73 or 74, and optionally, wherein the pair of consecutive data symbols comprises a pair of Quadrature Phase-Shift Keying (QPSK) constellation points.

Example 76 includes the subject matter of Example 75, and optionally, wherein the pair of QPSK constellation points comprises a first constellation point, and a second constellation point comprising a complex conjugate of the first constellation point.

Example 77 includes the subject matter of any one of Examples 67-72, and optionally, wherein the dual carrier modulation comprise a first constellation point, and a second constellation point comprising a Quadrature Phase-Shift Keying (QPSK) Dual Carrier Modulation (DCM).

Example 78 includes the subject matter of Example 77, and optionally, wherein the data bit sequence comprises four data bits.

Example 79 includes the subject matter of Example 78, and optionally, comprising means for mapping first and second data bits of the four data bits to a first QPSK constellation point, mapping third and fourth data bits of the four data bits to a second QPSK constellation point, and mapping the first and second QPSK constellation points to first and second 16 Quadrature Amplitude Modulation (16QAM) constellation points, the pair of consecutive data symbols comprising the first 16QAM constellation point and the second 16QAM constellation point.

Example 80 includes the subject matter of any one of Examples 67-79, and optionally, wherein the MIMO transmission comprises a 2×N MIMO transmission comprising two spatial transmit streams via two antennas.

Example 81 includes the subject matter of any one of Examples 67-80, and optionally, comprising means for transmitting the MIMO transmission over a Directional Multi-Gigabit (DMG) band.

Example 82 includes the subject matter of any one of Examples 67-81, and optionally, wherein the wireless station is a Directional Multi-Gigabit (DMG) Station (STA).

Example 83 includes an apparatus comprising logic and circuitry configured to cause a wireless station to receive a Multi-In-Multi-Out (MIMO) transmission comprising a plurality of spatial streams representing a plurality of data bit sequences; process the plurality of spatial streams to determine a plurality of data blocks, a data block of the plurality of data blocks comprising a plurality of pairs of consecutive data symbols, a first pair of data symbols of a first data block to be determined based on a first pair of subcarriers of a first Orthogonal Frequency Division Multiplexing (OFDM) symbol in a first spatial stream and a second pair of subcarriers of a second OFDM symbol in a second spatial stream, a second pair of data symbols of a second data block to be determined based on the first pair of subcarriers of the first OFDM symbol in the second spatial stream and the second pair of subcarriers of the second OFDM symbol in the first spatial stream; and determine the plurality of data bit sequences based on the plurality of data blocks by determining a first data bit sequence of the plurality of data bit sequences based on the first pair of data symbols, and a second data bit sequence of the plurality of data bit sequences based on the second pair of data symbols.

Example 84 includes the subject matter of Example 83, and optionally, wherein the first pair of subcarriers comprises a first subcarrier in a first sub-band of a signal band of the first OFDM symbol, and a second subcarrier in a second sub-band of the signal band of the first OFDM symbol, and the second pair of subcarriers comprises a third subcarrier in a first sub-band of a signal band of the second OFDM symbol, and a fourth subcarrier in a second sub-band of the signal band of the second OFDM symbol.

Example 85 includes the subject matter of Example 84, and optionally, wherein the first pair of data symbols comprises a k-th symbol and a (k+1)-th symbol in the first data block, the second pair of data symbols comprises a k-th symbol and a (k+1)-th symbol in the second data block, the first subcarrier comprises a k-th subcarrier in the first sub-band of the first OFDM symbol, the second subcarrier comprises a P(k)-th subcarrier in the second sub-band of the first OFDM symbol, the third subcarrier comprises a k-th data subcarrier in the first sub-band of the second OFDM symbol, and the fourth subcarrier comprises a P(k)-th subcarrier in the second sub-band of the second OFDM symbol, wherein P(k) is a predefined permutation of k.

Example 86 includes the subject matter of Example 85, and optionally, wherein P(k) comprises a Static Tone Pairing (STP) permutation.

Example 87 includes the subject matter of Example 85, and optionally, wherein P(k) comprises a Dynamic Tone Pairing (DTP) permutation.

Example 88 includes the subject matter of any one of Examples 84-87, and optionally, wherein the first sub-band of the first OFDM symbol comprises a first half of the signal band of the first OFDM symbol, the second sub-band of the first OFDM symbol comprises a second half of the signal band of the first OFDM symbol, the first sub-band of the second OFDM symbol comprises a first half of the signal band of the second OFDM symbol, and the second sub-band of the second OFDM symbol comprises a second half of the signal band of the second OFDM symbol.

Example 89 includes the subject matter of any one of Examples 83-88, and optionally, wherein the apparatus is configured to cause the wireless station to determine the plurality of data bit sequences according to a Staggered Quadrature Phase-Shift Keying (SQPSK) Dual Carrier Modulation (DCM) scheme.

Example 90 includes the subject matter of Example 89, and optionally, wherein each of the first and second data bit sequences comprises two data bits.

Example 91 includes the subject matter of Example 89 or 90, and optionally, wherein each of the first and second pairs of data symbols comprises a pair of Quadrature Phase-Shift Keying (QPSK) constellation points.

Example 92 includes the subject matter of Example 91, and optionally, wherein the pair of QPSK constellation points comprises a first constellation point, and a second constellation point comprising a complex conjugate of the first constellation point.

Example 93 includes the subject matter of any one of Examples 83-88, and optionally, wherein the apparatus is configured to cause the wireless station to determine the plurality of data bit sequences according to a Quadrature Phase-Shift Keying (QPSK) Dual Carrier Modulation (DCM) scheme.

Example 94 includes the subject matter of Example 93, and optionally, wherein each of the first and second data bit sequences comprises four data bits.

Example 95 includes the subject matter of any one of Examples 83-94, and optionally, wherein the MIMO transmission comprises a 2×N MIMO transmission comprising two spatial transmit streams.

Example 96 includes the subject matter of any one of Examples 83-95, and optionally, wherein the apparatus is configured to cause the wireless station to receive the MIMO transmission over a Directional Multi-Gigabit (DMG) band.

Example 97 includes the subject matter of any one of Examples 83-96, and optionally, wherein the wireless station is a Directional Multi-Gigabit (DMG) Station (STA).

Example 98 includes the subject matter of any one of Examples 83-97, and optionally, comprising a plurality of directional antennas to receive the plurality of spatial streams.

Example 99 includes the subject matter of any one of Examples 83-98, and optionally, comprising a radio, a memory, and a processor.

Example 100 includes a system of wireless communication comprising a wireless station, the wireless station comprising a plurality of directional antennas; a radio; a memory; a processor; and a controller configured to cause the wireless station to receive a Multi-In-Multi-Out (MIMO) transmission comprising a plurality of spatial streams representing a plurality of data bit sequences; process the plurality of spatial streams to determine a plurality of data blocks, a data block of the plurality of data blocks comprising a plurality of pairs of consecutive data symbols, a first pair of data symbols of a first data block to be determined based on a first pair of subcarriers of a first Orthogonal Frequency Division Multiplexing (OFDM) symbol in a first spatial stream and a second pair of subcarriers of a second OFDM symbol in a second spatial stream, a second pair of data symbols of a second data block to be determined based on the first pair of subcarriers of the first OFDM symbol in the second spatial stream and the second pair of subcarriers of the second OFDM symbol in the first spatial stream; and determine the plurality of data bit sequences based on the plurality of data blocks by determining a first data bit sequence of the plurality of data bit sequences based on the first pair of data symbols, and a second data bit sequence of the plurality of data bit sequences based on the second pair of data symbols.

Example 101 includes the subject matter of Example 100, and optionally, wherein the first pair of subcarriers comprises a first subcarrier in a first sub-band of a signal band of the first OFDM symbol, and a second subcarrier in a second sub-band of the signal band of the first OFDM symbol, and the second pair of subcarriers comprises a third subcarrier in a first sub-band of a signal band of the second OFDM symbol, and a fourth subcarrier in a second sub-band of the signal band of the second OFDM symbol.

Example 102 includes the subject matter of Example 101, and optionally, wherein the first pair of data symbols comprises a k-th symbol and a (k+1)-th symbol in the first data block, the second pair of data symbols comprises a k-th symbol and a (k+1)-th symbol in the second data block, the first subcarrier comprises a k-th subcarrier in the first sub-band of the first OFDM symbol, the second subcarrier comprises a P(k)-th subcarrier in the second sub-band of the first OFDM symbol, the third subcarrier comprises a k-th data subcarrier in the first sub-band of the second OFDM symbol, and the fourth subcarrier comprises a P(k)-th subcarrier in the second sub-band of the second OFDM symbol, wherein P(k) is a predefined permutation of k.

Example 103 includes the subject matter of Example 102, and optionally, wherein P(k) comprises a Static Tone Pairing (STP) permutation.

Example 104 includes the subject matter of Example 102, and optionally, wherein P(k) comprises a Dynamic Tone Pairing (DTP) permutation.

Example 105 includes the subject matter of any one of Examples 101-104, and optionally, wherein the first sub-band of the first OFDM symbol comprises a first half of the signal band of the first OFDM symbol, the second sub-band of the first OFDM symbol comprises a second half of the signal band of the first OFDM symbol, the first sub-band of the second OFDM symbol comprises a first half of the signal band of the second OFDM symbol, and the second sub-band of the second OFDM symbol comprises a second half of the signal band of the second OFDM symbol.

Example 106 includes the subject matter of any one of Examples 100-105, and optionally, wherein the controller is configured to cause the wireless station to determine the plurality of data bit sequences according to a Staggered Quadrature Phase-Shift Keying (SQPSK) Dual Carrier Modulation (DCM) scheme.

Example 107 includes the subject matter of Example 106, and optionally, wherein each of the first and second data bit sequences comprises two data bits.

Example 108 includes the subject matter of Example 106 or 107, and optionally, wherein each of the first and second pairs of data symbols comprises a pair of Quadrature Phase-Shift Keying (QPSK) constellation points.

Example 109 includes the subject matter of Example 108, and optionally, wherein the pair of QPSK constellation points comprises a first constellation point, and a second constellation point comprising a complex conjugate of the first constellation point.

Example 110 includes the subject matter of any one of Examples 100-105, and optionally, wherein the controller is configured to cause the wireless station to determine the plurality of data bit sequences according to a Quadrature Phase-Shift Keying (QPSK) Dual Carrier Modulation (DCM) scheme.

Example 111 includes the subject matter of Example 110, and optionally, wherein each of the first and second data bit sequences comprises four data bits.

Example 112 includes the subject matter of any one of Examples 100-111, and optionally, wherein the MIMO transmission comprises a 2×N MIMO transmission comprising two spatial transmit streams.

Example 113 includes the subject matter of any one of Examples 100-112, and optionally, wherein the controller is configured to cause the wireless station to receive the MIMO transmission over a Directional Multi-Gigabit (DMG) band.

Example 114 includes the subject matter of any one of Examples 100-113, and optionally, wherein the wireless station is a Directional Multi-Gigabit (DMG) Station (STA).

Example 115 includes a method to be performed at a wireless station, the method comprising receiving a Multi-In-Multi-Out (MIMO) transmission comprising a plurality of spatial streams representing a plurality of data bit sequences; processing the plurality of spatial streams to determine a plurality of data blocks, a data block of the plurality of data blocks comprising a plurality of pairs of consecutive data symbols, a first pair of data symbols of a first data block to be determined based on a first pair of subcarriers of a first Orthogonal Frequency Division Multiplexing (OFDM) symbol in a first spatial stream and a second pair of subcarriers of a second OFDM symbol in a second spatial stream, a second pair of data symbols of a second data block to be determined based on the first pair of subcarriers of the first OFDM symbol in the second spatial stream and the second pair of subcarriers of the second OFDM symbol in the first spatial stream; and determining the plurality of data bit sequences based on the plurality of data blocks by determining a first data bit sequence of the plurality of data bit sequences based on the first pair of data symbols, and a second data bit sequence of the plurality of data bit sequences based on the second pair of data symbols.

Example 116 includes the subject matter of Example 115, and optionally, wherein the first pair of subcarriers comprises a first subcarrier in a first sub-band of a signal band of the first OFDM symbol, and a second subcarrier in a second sub-band of the signal band of the first OFDM symbol, and the second pair of subcarriers comprises a third subcarrier in a first sub-band of a signal band of the second OFDM symbol, and a fourth subcarrier in a second sub-band of the signal band of the second OFDM symbol.

Example 117 includes the subject matter of Example 116, and optionally, wherein the first pair of data symbols comprises a k-th symbol and a (k+1)-th symbol in the first data block, the second pair of data symbols comprises a k-th symbol and a (k+1)-th symbol in the second data block, the first subcarrier comprises a k-th subcarrier in the first sub-band of the first OFDM symbol, the second subcarrier comprises a P(k)-th subcarrier in the second sub-band of the first OFDM symbol, the third subcarrier comprises a k-th data subcarrier in the first sub-band of the second OFDM symbol, and the fourth subcarrier comprises a P(k)-th subcarrier in the second sub-band of the second OFDM symbol, wherein P(k) is a predefined permutation of k.

Example 118 includes the subject matter of Example 117, and optionally, wherein P(k) comprises a Static Tone Pairing (STP) permutation.

Example 119 includes the subject matter of Example 117, and optionally, wherein P(k) comprises a Dynamic Tone Pairing (DTP) permutation.

Example 120 includes the subject matter of any one of Examples 116-119, and optionally, wherein the first sub-band of the first OFDM symbol comprises a first half of the signal band of the first OFDM symbol, the second sub-band of the first OFDM symbol comprises a second half of the signal band of the first OFDM symbol, the first sub-band of the second OFDM symbol comprises a first half of the signal band of the second OFDM symbol, and the second sub-band of the second OFDM symbol comprises a second half of the signal band of the second OFDM symbol.

Example 121 includes the subject matter of any one of Examples 115-120, and optionally, comprising determining the plurality of data bit sequences according to a Staggered Quadrature Phase-Shift Keying (SQPSK) Dual Carrier Modulation (DCM) scheme.

Example 122 includes the subject matter of Example 121, and optionally, wherein each of the first and second data bit sequences comprises two data bits.

Example 123 includes the subject matter of Example 121 or 122, and optionally, wherein each of the first and second pairs of data symbols comprises a pair of Quadrature Phase-Shift Keying (QPSK) constellation points.

Example 124 includes the subject matter of Example 123, and optionally, wherein the pair of QPSK constellation points comprises a first constellation point, and a second constellation point comprising a complex conjugate of the first constellation point.

Example 125 includes the subject matter of any one of Examples 115-120, and optionally, comprising determining the plurality of data bit sequences according to a Quadrature Phase-Shift Keying (QPSK) Dual Carrier Modulation (DCM) scheme.

Example 126 includes the subject matter of Example 125, and optionally, wherein each of the first and second data bit sequences comprises four data bits.

Example 127 includes the subject matter of any one of Examples 115-126, and optionally, wherein the MIMO transmission comprises a 2×N MIMO transmission comprising two spatial transmit streams.

Example 128 includes the subject matter of any one of Examples 115-127, and optionally, comprising receiving the MIMO transmission over a Directional Multi-Gigabit (DMG) band.

Example 129 includes the subject matter of any one of Examples 115-128, and optionally, wherein the wireless station is a Directional Multi-Gigabit (DMG) Station (STA).

Example 130 includes a product comprising one or more tangible computer-readable non-transitory storage media comprising computer-executable instructions operable to, when executed by at least one computer processor, enable the at least one computer processor to implement operations at a wireless station, the operations comprising receiving a Multi-In-Multi-Out (MIMO) transmission comprising a plurality of spatial streams representing a plurality of data bit sequences; processing the plurality of spatial streams to determine a plurality of data blocks, a data block of the plurality of data blocks comprising a plurality of pairs of consecutive data symbols, a first pair of data symbols of a first data block to be determined based on a first pair of subcarriers of a first Orthogonal Frequency Division Multiplexing (OFDM) symbol in a first spatial stream and a second pair of subcarriers of a second OFDM symbol in a second spatial stream, a second pair of data symbols of a second data block to be determined based on the first pair of subcarriers of the first OFDM symbol in the second spatial stream and the second pair of subcarriers of the second OFDM symbol in the first spatial stream; and determining the plurality of data bit sequences based on the plurality of data blocks by determining a first data bit sequence of the plurality of data bit sequences based on the first pair of data symbols, and a second data bit sequence of the plurality of data bit sequences based on the second pair of data symbols.

Example 131 includes the subject matter of Example 130, and optionally, wherein the first pair of subcarriers comprises a first subcarrier in a first sub-band of a signal band of the first OFDM symbol, and a second subcarrier in a second sub-band of the signal band of the first OFDM symbol, and the second pair of subcarriers comprises a third subcarrier in a first sub-band of a signal band of the second OFDM symbol, and a fourth subcarrier in a second sub-band of the signal band of the second OFDM symbol.

Example 132 includes the subject matter of Example 131, and optionally, wherein the first pair of data symbols comprises a k-th symbol and a (k+1)-th symbol in the first data block, the second pair of data symbols comprises a k-th symbol and a (k+1)-th symbol in the second data block, the first subcarrier comprises a k-th subcarrier in the first sub-band of the first OFDM symbol, the second subcarrier comprises a P(k)-th subcarrier in the second sub-band of the first OFDM symbol, the third subcarrier comprises a k-th data subcarrier in the first sub-band of the second OFDM symbol, and the fourth subcarrier comprises a P(k)-th subcarrier in the second sub-band of the second OFDM symbol, wherein P(k) is a predefined permutation of k.

Example 133 includes the subject matter of Example 132, and optionally, wherein P(k) comprises a Static Tone Pairing (STP) permutation.

Example 134 includes the subject matter of Example 132, and optionally, wherein P(k) comprises a Dynamic Tone Pairing (DTP) permutation.

Example 135 includes the subject matter of any one of Examples 131-134, and optionally, wherein the first sub-band of the first OFDM symbol comprises a first half of the signal band of the first OFDM symbol, the second sub-band of the first OFDM symbol comprises a second half of the signal band of the first OFDM symbol, the first sub-band of the second OFDM symbol comprises a first half of the signal band of the second OFDM symbol, and the second sub-band of the second OFDM symbol comprises a second half of the signal band of the second OFDM symbol.

Example 136 includes the subject matter of any one of Examples 130-135, and optionally, wherein the operations comprise determining the plurality of data bit sequences according to a Staggered Quadrature Phase-Shift Keying (SQPSK) Dual Carrier Modulation (DCM) scheme.

Example 137 includes the subject matter of Example 136, and optionally, wherein each of the first and second data bit sequences comprises two data bits.

Example 138 includes the subject matter of Example 136 or 137, and optionally, wherein each of the first and second pairs of data symbols comprises a pair of Quadrature Phase-Shift Keying (QPSK) constellation points.

Example 139 includes the subject matter of Example 138, and optionally, wherein the pair of QPSK constellation points comprises a first constellation point, and a second constellation point comprising a complex conjugate of the first constellation point.

Example 140 includes the subject matter of any one of Examples 130-135, and optionally, wherein the operations comprise determining the plurality of data bit sequences according to a Quadrature Phase-Shift Keying (QPSK) Dual Carrier Modulation (DCM) scheme.

Example 141 includes the subject matter of Example 140, and optionally, wherein each of the first and second data bit sequences comprises four data bits.

Example 142 includes the subject matter of any one of Examples 130-141, and optionally, wherein the MIMO transmission comprises a 2×N MIMO transmission comprising two spatial transmit streams.

Example 143 includes the subject matter of any one of Examples 130-142, and optionally, wherein the operations comprise receiving the MIMO transmission over a Directional Multi-Gigabit (DMG) band.

Example 144 includes the subject matter of any one of Examples 130-143, and optionally, wherein the wireless station is a Directional Multi-Gigabit (DMG) Station (STA).

Example 145 includes an apparatus of a wireless station, the apparatus comprising means for receiving a Multi-In-Multi-Out (MIMO) transmission comprising a plurality of spatial streams representing a plurality of data bit sequences; means for processing the plurality of spatial streams to determine a plurality of data blocks, a data block of the plurality of data blocks comprising a plurality of pairs of consecutive data symbols, a first pair of data symbols of a first data block to be determined based on a first pair of subcarriers of a first Orthogonal Frequency Division Multiplexing (OFDM) symbol in a first spatial stream and a second pair of subcarriers of a second OFDM symbol in a second spatial stream, a second pair of data symbols of a second data block to be determined based on the first pair of subcarriers of the first OFDM symbol in the second spatial stream and the second pair of subcarriers of the second OFDM symbol in the first spatial stream; and means for determining the plurality of data bit sequences based on the plurality of data blocks by determining a first data bit sequence of the plurality of data bit sequences based on the first pair of data symbols, and a second data bit sequence of the plurality of data bit sequences based on the second pair of data symbols.

Example 146 includes the subject matter of Example 145, and optionally, wherein the first pair of subcarriers comprises a first subcarrier in a first sub-band of a signal band of the first OFDM symbol, and a second subcarrier in a second sub-band of the signal band of the first OFDM symbol, and the second pair of subcarriers comprises a third subcarrier in a first sub-band of a signal band of the second OFDM symbol, and a fourth subcarrier in a second sub-band of the signal band of the second OFDM symbol.

Example 147 includes the subject matter of Example 146, and optionally, wherein the first pair of data symbols comprises a k-th symbol and a (k+1)-th symbol in the first data block, the second pair of data symbols comprises a k-th symbol and a (k+1)-th symbol in the second data block, the first subcarrier comprises a k-th subcarrier in the first sub-band of the first OFDM symbol, the second subcarrier comprises a P(k)-th subcarrier in the second sub-band of the first OFDM symbol, the third subcarrier comprises a k-th data subcarrier in the first sub-band of the second OFDM symbol, and the fourth subcarrier comprises a P(k)-th subcarrier in the second sub-band of the second OFDM symbol, wherein P(k) is a predefined permutation of k.

Example 148 includes the subject matter of Example 147, and optionally, wherein P(k) comprises a Static Tone Pairing (STP) permutation.

Example 149 includes the subject matter of Example 147, and optionally, wherein P(k) comprises a Dynamic Tone Pairing (DTP) permutation.

Example 150 includes the subject matter of any one of Examples 146-149, and optionally, wherein the first sub-band of the first OFDM symbol comprises a first half of the signal band of the first OFDM symbol, the second sub-band of the first OFDM symbol comprises a second half of the signal band of the first OFDM symbol, the first sub-band of the second OFDM symbol comprises a first half of the signal band of the second OFDM symbol, and the second sub-band of the second OFDM symbol comprises a second half of the signal band of the second OFDM symbol.

Example 151 includes the subject matter of any one of Examples 145-150, and optionally, comprising means for determining the plurality of data bit sequences according to a Staggered Quadrature Phase-Shift Keying (SQPSK) Dual Carrier Modulation (DCM) scheme.

Example 152 includes the subject matter of Example 151, and optionally, wherein each of the first and second data bit sequences comprises two data bits.

Example 153 includes the subject matter of Example 151 or 152, and optionally, wherein each of the first and second pairs of data symbols comprises a pair of Quadrature Phase-Shift Keying (QPSK) constellation points.

Example 154 includes the subject matter of Example 153, and optionally, wherein the pair of QPSK constellation points comprises a first constellation point, and a second constellation point comprising a complex conjugate of the first constellation point.

Example 155 includes the subject matter of any one of Examples 145-150, and optionally, comprising means for determining the plurality of data bit sequences according to a Quadrature Phase-Shift Keying (QPSK) Dual Carrier Modulation (DCM) scheme.

Example 156 includes the subject matter of Example 155, and optionally, wherein each of the first and second data bit sequences comprises four data bits.

Example 157 includes the subject matter of any one of Examples 145-156, and optionally, wherein the MIMO transmission comprises a 2×N MIMO transmission comprising two spatial transmit streams.

Example 158 includes the subject matter of any one of Examples 145-157, and optionally, comprising means for receiving the MIMO transmission over a Directional Multi-Gigabit (DMG) band.

Example 159 includes the subject matter of any one of Examples 145-158, and optionally, wherein the wireless station is a Directional Multi-Gigabit (DMG) Station (STA).

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a wireless station to:
    modulate a plurality of data bit sequences into a plurality of data blocks in a frequency domain according to a dual carrier modulation, a data bit sequence of said plurality of data bit sequences to be modulated into a pair of consecutive data symbols in a data block of said plurality of data blocks;
    map the plurality of data blocks to a plurality of spatial streams by mapping a first pair of data symbols of a first data block to a first pair of respective subcarriers of a first Orthogonal Frequency Division Multiplexing (OFDM) symbol in a first spatial stream, mapping a second pair of data symbols of a second data block to the first pair of respective subcarriers of the first OFDM symbol in a second spatial stream, mapping a complex conjugate of the first pair of data symbols to a second pair of respective subcarriers of a second OFDM symbol in the second spatial stream, and mapping a sign-inversed complex conjugate of the second pair of data symbols to the second pair of respective subcarriers of the second OFDM symbol in the first spatial stream, wherein the first pair of subcarriers comprises a first subcarrier in a first sub-band of a signal band of the first OFDM symbol and a second subcarrier in a second sub-band of the signal band of the first OFDM symbol, the second pair of subcarriers comprises a third subcarrier in a first sub-band of a signal band of the second OFDM symbol and a fourth subcarrier in a second sub-band of the signal band of the second OFDM symbol; and
    transmit a Multi-In-Multi-Out (MIMO) transmission based on the plurality of spatial streams.

2. The apparatus of claim 1, wherein the first pair of data symbols comprises a k-th symbol and a (k+1)th symbol in said first data block, the second pair of data symbols comprises a k-th symbol and a (k+1)th symbol in said second data block, the first subcarrier comprises a k-th subcarrier in the first sub-band of the first OFDM symbol, the second subcarrier comprises a P(k)-th subcarrier in the second sub-band of the first OFDM symbol, the third subcarrier comprises a k-th subcarrier in the first sub-band of the second OFDM symbol, and the fourth subcarrier comprises a P(k)-th subcarrier in the second sub-band of the second OFDM symbol, wherein P(k) is a predefined permutation of k.

3. The apparatus of claim 1, wherein the first sub-band of the first OFDM symbol comprises a first half of the signal band of the first OFDM symbol, the second sub-band of the first OFDM symbol comprises a second half of the signal band of the first OFDM symbol, the first sub-band of the second OFDM symbol comprises a first half of the signal band of the second OFDM symbol, and the second sub-band of the second OFDM symbol comprises a second half of the signal band of the second OFDM symbol.

4. The apparatus of claim 1, wherein the dual carrier modulation comprises a Staggered Quadrature Phase-Shift Keying (SQPSK) Dual Carrier Modulation (DCM).

5. The apparatus of claim 4, wherein the data bit sequence comprises two data bits.

6. The apparatus of claim 4, wherein the pair of consecutive data symbols comprises a pair of Quadrature Phase-Shift Keying (QPSK) constellation points.

7. The apparatus of claim 6, wherein the pair of QPSK constellation points comprises a first constellation point, and a second constellation point comprising a complex conjugate of the first constellation point.

8. The apparatus of claim 1, wherein the dual carrier modulation comprises a Quadrature Phase-Shift Keying (QPSK) Dual Carrier Modulation (DCM).

9. The apparatus of claim 8, wherein the data bit sequence comprises four data bits.

10. The apparatus of claim 9 configured to cause the wireless station to map first and second data bits of the four data bits to a first QPSK constellation point, to map third and fourth data bits of the four data bits to a second QPSK constellation point, and to map the first and second QPSK constellation points to first and second 16 Quadrature Amplitude Modulation (16QAM) constellation points, the pair of consecutive data symbols comprising the first 16QAM constellation point and the second 16QAM constellation point.

11. The apparatus of claim 1, wherein the MIMO transmission comprises a 2×N MIMO transmission comprising two spatial transmit streams via two antennas.

12. The apparatus of claim 1 configured to cause the wireless station to transmit the MIMO transmission over a Directional Multi-Gigabit (DMG) band.

13. The apparatus of claim 1 comprising a plurality of directional antennas to transmit the plurality of spatial streams.

14. The apparatus of claim 1 comprising a radio, a memory, and a processor.

15. A product comprising one or more tangible computer-readable non-transitory storage media comprising computer-executable instructions operable to, when executed by at least one processor, enable the at least one processor to cause a wireless station to:

modulate a plurality of data bit sequences into a plurality of data blocks in a frequency domain according to a dual carrier modulation, a data bit sequence of said plurality of data bit sequences to be modulated into a pair of consecutive data symbols in a data block of said plurality of data blocks;

map the plurality of data blocks to a plurality of spatial streams by mapping a first pair of data symbols of a first data block to a first pair of respective subcarriers of a first Orthogonal Frequency Division Multiplexing (OFDM) symbol in a first spatial stream, mapping a second pair of data symbols of a second data block to the first pair of respective subcarriers of the first OFDM symbol in a second spatial stream, mapping a complex conjugate of the first pair of data symbols to a second pair of respective subcarriers of a second OFDM symbol in the second spatial stream, and mapping a sign-inversed complex conjugate of the second pair of data symbols to the second pair of respective subcarriers of the second OFDM symbol in the first spatial stream, wherein the first pair of subcarriers comprises a first subcarrier in a first sub-band of a signal band of the first OFDM symbol and a second subcarrier in a second sub-band of the signal band of the first OFDM symbol, the second pair of subcarriers comprises a third subcarrier in a first sub-band of a signal band of the second OFDM symbol and a fourth subcarrier in a second sub-band of the signal band of the second OFDM symbol; and transmit a Multi-In-Multi-Out (MIMO) transmission based on the plurality of spatial streams.

16. The product of claim 15, wherein the first pair of data symbols comprises a k-th symbol and a (k+1)-th symbol in said first data block, the second pair of data symbols comprises a k-th symbol and a (k+1)-th symbol in said second data block, the first subcarrier comprises a k-th subcarrier in the first sub-band of the first OFDM symbol, the second subcarrier comprises a P(k)-th subcarrier in the second sub-band of the first OFDM symbol, the third subcarrier comprises a k-th subcarrier in the first sub-band of the second OFDM symbol, and the fourth subcarrier comprises a P(k)-th subcarrier in the second sub-band of the second OFDM symbol, wherein P(k) is a predefined permutation of k.

17. The product of claim 15, wherein the first sub-band of the first OFDM symbol comprises a first half of the signal band of the first OFDM symbol, the second sub-band of the first OFDM symbol comprises a second half of the signal band of the first OFDM symbol, the first sub-band of the second OFDM symbol comprises a first half of the signal band of the second OFDM symbol, and the second sub-band of the second OFDM symbol comprises a second half of the signal band of the second OFDM symbol.

18. An apparatus comprising logic and circuitry configured to cause a wireless station to:

modulate a plurality of data bit sequences into a plurality of data blocks in a frequency domain according to a dual carrier modulation, a data bit sequence of said plurality of data bit sequences to be modulated into a pair of data symbols in a data block of said plurality of data blocks;

map the plurality of data blocks to a plurality of spatial streams by mapping a first pair of data symbols of a first data block to a first plurality of encoded data points in a first respective plurality of subcarriers, and by mapping a second pair of data symbols of a second data block to a second plurality of encoded data points in a second respective plurality of subcarriers, the first plurality of encoded data points comprising the first pair of data symbols and a complex conjugate of the first pair of data symbols, the second plurality of encoded data points comprising the second pair of data symbols and a sign-inversed complex conjugate of the second pair of data symbols, the first plurality of subcarriers comprising a first pair of subcarriers of a first Orthogonal Frequency Division Multiplexing (OFDM) symbol in a first spatial stream and a second pair of subcarriers of a second OFDM symbol in a second spatial stream, the second plurality of subcarriers comprising the first pair of subcarriers of the first OFDM symbol in the second spatial stream and the second pair of subcarriers of the second OFDM symbol in the first spatial stream, wherein the first pair of subcarriers comprises a first subcarrier in a first sub-band of a signal band of the first OFDM symbol and a second subcarrier in a second sub-band of the signal band of the first OFDM symbol, the second pair of subcarriers comprises a third subcarrier in a first sub-band of a signal band of the second OFDM symbol and a fourth subcarrier in a second sub-band of the signal band of the second OFDM symbol, wherein the first pair of data symbols comprises a k-th symbol in said first data block, the second pair of data symbols comprises a k-th symbol in said second data block, the first subcarrier comprises a k-th subcarrier in the first sub-band of the first OFDM symbol, the second subcarrier comprises a P(k)-th subcarrier in the second sub-band of the first OFDM symbol, the third subcarrier comprises a k-th subcarrier in the first sub-band of the second OFDM symbol, and the fourth subcarrier comprises a P(k)-th subcarrier in the second sub-band of the second OFDM symbol, wherein P(k) is a predefined function of k; and transmit a Multi-In-Multi-Out (MIMO) transmission based on the plurality of spatial streams.

19. The apparatus of claim 18, wherein the dual carrier modulation comprises a Dual Carrier Modulation (DCM) Quadrature Phase-Shift Keying (QPSK) modulation.

20. The apparatus of claim 18, wherein the first sub-band of the first OFDM symbol comprises a first half of the signal band of the first OFDM symbol, the second sub-band of the first OFDM symbol comprises a second half of the signal band of the first OFDM symbol, the first sub-band of the second OFDM symbol comprises a first half of the signal band of the second OFDM symbol, and the second sub-band of the second OFDM symbol comprises a second half of the signal band of the second OFDM symbol.

21. The apparatus of claim 18 comprising a radio, a memory, and a processor.

22. A product comprising one or more tangible computer-readable non-transitory storage media comprising computer-executable instructions operable to, when executed by at least one processor, enable the at least one processor to cause a wireless station to:

modulate a plurality of data bit sequences into a plurality of data blocks in a frequency domain according to a dual carrier modulation, a data bit sequence of said plurality of data bit sequences to be modulated into a pair of data symbols in a data block of said plurality of data blocks;

map the plurality of data blocks to a plurality of spatial streams by mapping a first pair of data symbols of a first data block to a first plurality of encoded data points in a first respective plurality of subcarriers, and by mapping a second pair of data symbols of a second data block to a second plurality of encoded data points in a second respective plurality of subcarriers, the first plurality of encoded data points comprising the first pair of data symbols and a complex conjugate of the first pair of data symbols, the second plurality of encoded data points comprising the second pair of data symbols and a sign-inversed complex conjugate of the second pair of data symbols, the first plurality of subcarriers comprising a first pair of subcarriers of a first Orthogonal Frequency Division Multiplexing (OFDM) symbol in a first spatial stream and a second pair of subcarriers of a second OFDM symbol in a second spatial stream, the second plurality of subcarriers comprising the first pair of subcarriers of the first OFDM symbol in the second spatial stream and the second pair of subcarriers of the second OFDM symbol in the first spatial stream, wherein the first pair of subcarriers comprises a first subcarrier in a first sub-band of a signal band of the first OFDM symbol and a second subcarrier in a second sub-band of the signal band of the first OFDM symbol, the second pair of subcarriers comprises a third subcarrier in a first sub-band of a signal band of the second OFDM symbol and a fourth subcarrier in a second sub-band of the signal band of the second OFDM symbol, wherein the first pair of data symbols comprises a k-th symbol in said first data block, the second pair of data symbols comprises a k-th symbol in said second data block, the first subcarrier comprises a k-th subcarrier in the first sub-band of the first OFDM symbol, the second subcarrier comprises a P(k)-th subcarrier in the second sub-band of the first OFDM symbol, the third subcarrier comprises a k-th subcarrier in the first sub-band of the second OFDM symbol, and the fourth subcarrier comprises a P(k)-th subcarrier in the second sub-band of the second OFDM symbol, wherein P(k) is a predefined function of k; and transmit a Multi-In-Multi-Out (MIMO) transmission based on the plurality of spatial streams.

23. The product of claim 22, wherein the dual carrier modulation comprises a Dual Carrier Modulation (DCM) Quadrature Phase-Shift Keying (QPSK) modulation.

24. The product of claim 22, wherein the first sub-band of the first OFDM symbol comprises a first half of the signal band of the first OFDM symbol, the second sub-band of the first OFDM symbol comprises a second half of the signal band of the first OFDM symbol, the first sub-band of the second OFDM symbol comprises a first half of the signal band of the second OFDM symbol, and the second sub-band of the second OFDM symbol comprises a second half of the signal band of the second OFDM symbol.

* * * * *

UNITED STATES PATENT AND TRADEMARK OFFICE
CERTIFICATE OF CORRECTION

PATENT NO. : 10,454,548 B2
APPLICATION NO. : 15/278928
DATED : October 22, 2019
INVENTOR(S) : Artyom Lomayev et al.

Page 1 of 1

It is certified that error appears in the above-identified patent and that said Letters Patent is hereby corrected as shown below:

In the Claims

In Column 44, Line 4, in Claim 2, delete "and a (k+1)th symbol" and insert -- and a (k+1)-th symbol --, therefor.

In Column 44, Line 6, in Claim 2, delete "and a (k+1)th symbol" and insert -- and a (k+1)-th symbol --, therefor.

Signed and Sealed this
Fourth Day of February, 2020

Andrei Iancu
*Director of the United States Patent and Trademark Office*